US010846675B1

(12) United States Patent
Smith

(10) Patent No.: US 10,846,675 B1
(45) Date of Patent: *Nov. 24, 2020

(54) STORAGE AND RETRIEVAL SYSTEM AND METHODS

(71) Applicant: John T. Smith, Harmon, IL (US)

(72) Inventor: John T. Smith, Harmon, IL (US)

(73) Assignee: Creative Methods, Inc., Harmon, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,345

(22) Filed: Aug. 2, 2019

Related U.S. Application Data

(63) Continuation of application No. 15/872,804, filed on Jan. 16, 2018, now abandoned, which is a continuation of application No. 15/135,177, filed on Apr. 21, 2016, now abandoned, which is a continuation-in-part of application No. 15/009,540, filed on Jan. 28, 2016, now Pat. No. 9,756,937, which is a continuation of application No. 14/697,809, filed on Apr. 28, 2015, now Pat. No. 9,277,811, which is a continuation of application No. 13/896,069, filed on May 16, 2013, now Pat. No. 9,044,106.

(60) Provisional application No. 61/648,002, filed on May 16, 2012, provisional application No. 62/150,699, filed on Apr. 21, 2015.

(51) Int. Cl.
*G06Q 20/18* (2012.01)
*G06Q 20/20* (2012.01)

(52) U.S. Cl.
CPC .......... *G06Q 20/18* (2013.01); *G06Q 20/209* (2013.01)

(58) Field of Classification Search
CPC ... A47B 49/008; A47B 49/002; A47B 63/067; A47F 3/11; B65G 1/127; B65G 21/22; B65G 21/20; B65G 21/2045
USPC .... 312/266–268, 91, 97, 134; 221/119, 121, 221/122
See application file for complete search history.

(56) References Cited

U.S. PATENT DOCUMENTS

| | | |
|---|---|---|
| 3,199,658 A | 8/1965 | Graber et al. |
| RE25,919 E | 11/1965 | Anders et al. |
| 3,236,577 A | 2/1966 | Anders et al. |
| 3,290,104 A | 12/1966 | Brautovich |
| 3,720,451 A | 3/1973 | Anders |
| 4,877,121 A | 10/1989 | Yamashita et al. |
| 4,942,290 A | 7/1990 | Frerking |
| 5,273,183 A | 12/1993 | Tuttobene |
| 5,344,042 A | 9/1994 | Crosby et al. |
| 5,431,299 A | 7/1995 | Brewer et al. |

(Continued)

FOREIGN PATENT DOCUMENTS

| | | | | |
|---|---|---|---|---|
| DE | 3825104 A1 | * | 2/1990 | ............... C08F 8/12 |
| DE | 4342083 A1 | * | 6/1995 | ............ A47B 51/00 |
| JP | 2008111886 A | | 5/2008 | |

*Primary Examiner* — Andrew M Roersma
(74) *Attorney, Agent, or Firm* — Hamilton IP Law, PC; Jay R. Hamilton; Charles Damschen

(57) ABSTRACT

A vending storage and retrieval system may include a housing with a screen, camera, scanner, card reader, and receipt port positioned on various exterior portions of the housing. Other hardware components may be positioned interiorly with respect to the housing. Such hardware components include but are not limited to a collection assembly, shelf, receipt printer, and central processing unit. A dispensing port may be positioned on said housing to provide access through said housing.

7 Claims, 28 Drawing Sheets

(56) References Cited

U.S. PATENT DOCUMENTS

| | | | |
|---|---|---|---|
| 6,056,134 A * | 5/2000 | Katzenschwanz | B65G 1/0421 |
| | | | 211/1.57 |
| 6,068,156 A | 5/2000 | Liff et al. | |
| 6,170,929 B1 | 1/2001 | Wilson et al. | |
| 6,309,034 B1 * | 10/2001 | Credle, Jr. | A47F 3/043 |
| | | | 108/94 |
| 6,536,559 B1 * | 3/2003 | Siegler | B65G 1/127 |
| | | | 187/223 |
| 6,758,394 B2 | 7/2004 | Maskatiya et al. | |
| 6,854,815 B1 * | 2/2005 | Smith | A47B 49/008 |
| | | | 198/802 |
| 7,194,333 B2 | 3/2007 | Shoenfeld | |
| 7,564,349 B2 | 7/2009 | Robey | |
| 7,743,930 B2 | 6/2010 | Krohn | |
| 7,769,632 B2 | 8/2010 | Giraud et al. | |
| 7,783,379 B2 | 8/2010 | Beane et al. | |
| 8,355,962 B2 | 1/2013 | Delaney et al. | |
| 9,044,106 B1 * | 6/2015 | Smith | A47F 3/06 |
| 9,224,137 B1 | 12/2015 | Tomasi et al. | |
| 9,277,809 B2 | 3/2016 | Flaherty et al. | |
| 9,277,811 B1 * | 3/2016 | Smith | A47F 3/06 |
| 9,756,937 B1 * | 9/2017 | Smith | A47F 3/06 |
| 2001/0000535 A1 | 4/2001 | Lapsley et al. | |
| 2002/0083008 A1 | 6/2002 | Smith et al. | |
| 2002/0111213 A1 | 8/2002 | McEntee et al. | |
| 2005/0080681 A1 | 4/2005 | Ohnishi | |
| 2005/0149414 A1 | 7/2005 | Schrodt et al. | |
| 2005/0236417 A1 * | 10/2005 | Baker | G07F 11/26 |
| | | | 221/92 |
| 2006/0049200 A1 | 3/2006 | Savage et al. | |
| 2007/0095901 A1 | 5/2007 | Illingworth | |
| 2009/0283586 A1 | 11/2009 | Cecere | |
| 2009/0289469 A1 * | 11/2009 | Thiele | E05F 15/42 |
| | | | 296/146.1 |
| 2011/0005264 A1 * | 1/2011 | Lee | F25D 23/021 |
| | | | 62/449 |
| 2011/0101837 A1 | 5/2011 | Solomon | |
| 2011/0125561 A1 | 5/2011 | Marcus | |
| 2011/0145073 A1 | 6/2011 | Richman et al. | |
| 2011/0151837 A1 | 6/2011 | Winbush | |
| 2011/0297691 A1 | 12/2011 | Freeman | |
| 2012/0029691 A1 | 2/2012 | Mockus et al. | |
| 2015/0287108 A1 | 10/2015 | Monk | |

* cited by examiner

STORAGE AND RETRIEVAL SYSTEM AND METHODS

CROSS REFERENCE TO RELATED APPLICATIONS

The present application is a continuation of and claims priority from U.S. patent application Ser. No. 15/872,804 filed on Jan. 16, 2018, which application was a continuation of and claims priority from U.S. patent application Ser. No. 15/135,177 filed on Apr. 21, 2016, which application was a continuation in part of and claimed priority from U.S. patent application Ser. No. 15/009,540 (and which application also claimed priority from provisional Pat. App. No. 62/150,699 filed on Apr. 21, 2015), which was a continuation of and claimed priority from U.S. patent application Ser. No. 14/697,809, (now U.S. Pat. No. 9,277,811) which application was a continuation of and claimed priority from Ser. No. 13/896,069 (now U.S. Pat. No. 9,044,106) filed on May 16, 2013, which application claimed priority under 35 U.S.C. 119(e) from provisional U.S. Pat. App. No. 61/648,002 filed on May 16, 2012, all of which are incorporated by reference herein in their entireties.

FIELD OF THE INVENTION

The present invention relates generally to product shelving, display, storage, purchase, and/or retrieval.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. § 1.171 (d)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

DESCRIPTION OF THE PRIOR ART

Retail stores commonly display merchandise on fixed-position shelves for viewing and selection by a consumer. However, such use of conventional shelves has certain drawbacks and disadvantages to both the store and the consumer. For example, use of conventional shelves to display merchandise can result in inefficient use of floor space because it limits the useable height of shelving to that which the consumer can reach. Space above this height is either not used or must be accessed by store personal with a ladder. Use of conventional shelves also presents obstacles to consumers who cannot reach the top or bottom shelves; such as consumers in wheelchairs or mobile carts, consumers with certain disabilities or disabling injuries, and consumers that are simply shorter than average.

Shelves configured for vertical carousel rotation present the potential to use the space above conventional fixed-position shelves for storing merchandise that can be brought to all consumers. A variety of carousel shelving units are known and have been used in a variety of settings for various purposes. For example, U.S. Pat. Nos. 2,603,547; 2,442,070; 1,680,035; 4,314,647; 2,703,643; 3,299,658; 3,298,536; all of which are incorporated by reference herein, disclose vertical carousel shelving units of different configurations, some of which are intended to display merchandise in retail stores. Additionally, U.S. Pat. No. 6,119,880 issued to Applicant discloses a vertically oriented carousel shelving unit.

BRIEF DESCRIPTION OF FIGURES

The accompanying drawings, which are incorporated in and constitute a part of this specification, illustrate embodiments and together with the description, serve to explain the principles of the methods and systems.

DETAILED DESCRIPTION OF THE INVENTION

Figure 1:
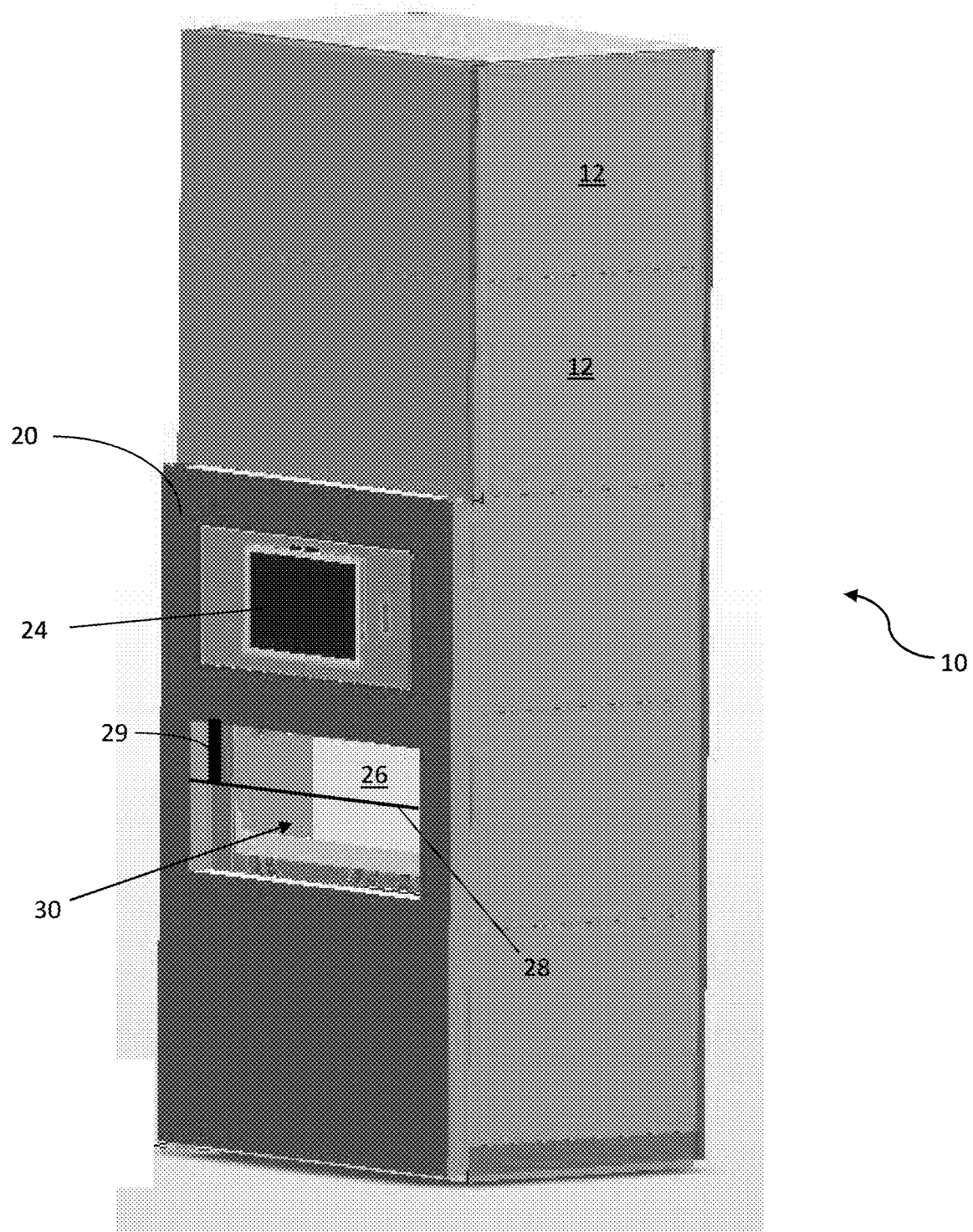
FIG. 1 provides a perspective view of a first illustrative embodiment of a storage and retrieval system.

| Element Description | Element Number |
| --- | --- |
| Storage and retrieval system | 10 |
| Exterior panel | 12 |
| Frame member | 14 |
| Front exterior panel | 20 |
| Access port | 22 |
| Scanner | 23 |
| First display | 24 |
| Second display | 25 |
| Door flap | 26 |
| Lower door flap | 26a |
| Pivot mechanism | 27 |
| Storage assembly | 30 |
| Side plate | 31 |
| Guide | 31a |
| Drive keeper | 31b |
| Storage member | 32 |
| Side surface | 32a |
| Bottom surface | 32b |
| Front ledge | 32c |
| Back wall | 32d |
| Partition | 32e |
| Drive member | 36 |
| Coupling member | 37 |
| Positioning assembly | 40 |
| Plate | 42 |
| Pin | 43 |
| Fixed arm | 44 |
| Roller | 45 |
| Pivot arm | 46 |
| Connector | 47 |
| Vending storage and retrieval system | 110 |
| Housing | 111 |
| Screen | 112 |
| Dispensing port | 114 |
| Camera | 116 |
| Card reader | 117 |
| Scanner | 118 |
| Receipt port | 119 |

Before the present methods and systems are disclosed and described, it is to be understood that the methods and systems are not limited to specific methods, specific components, or to particular implementations unless so indicated in the following claims. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions can also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions can also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

First Illustrative System and Method

Referring now to the drawings, wherein like reference numerals designate identical or corresponding parts throughout the several views, FIG. 1 provides a perspective view of a first illustrative embodiment of a storage and retrieval system 10 is shown in FIG. 1. Broadly, the illustrative embodiment of a storage and retrieval system 10 facilitates better use of floor space by making multiple items available at a convenient location for a user, generally adjacent an access port 22 positioned in a front exterior panel 20, as described in further detail below. A plurality of exterior panels 12 may be engaged with one or more frame members 14 to provide a useful and/or aesthetically pleasing exterior to the storage and retrieval system 10.

Figure 3A:
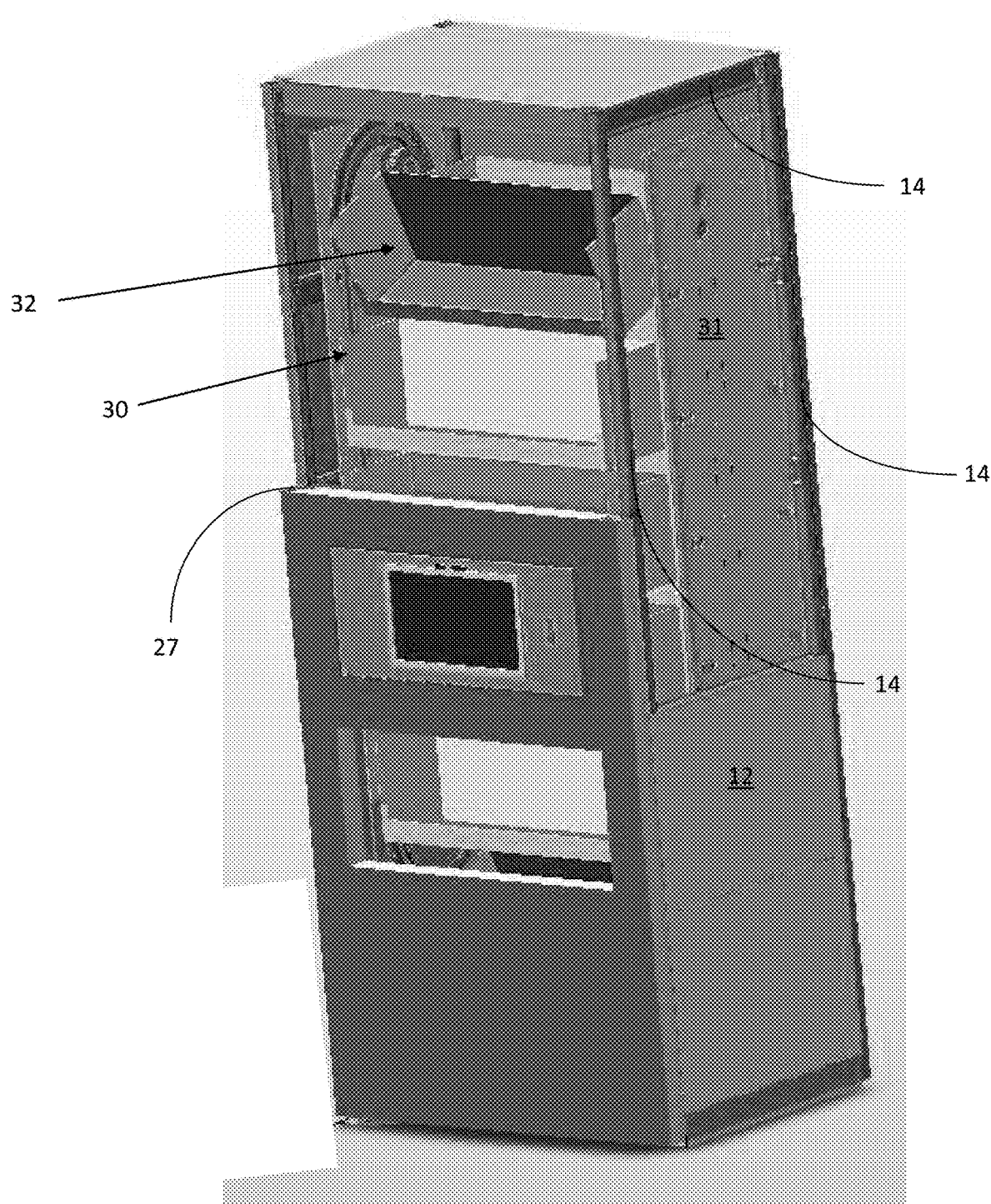
FIG. 3A provides a perspective view of the embodiment of a storage and retrieval system shown in FIG. 1 wherein certain exterior panels have been removed for clarity.
Figure 3B:
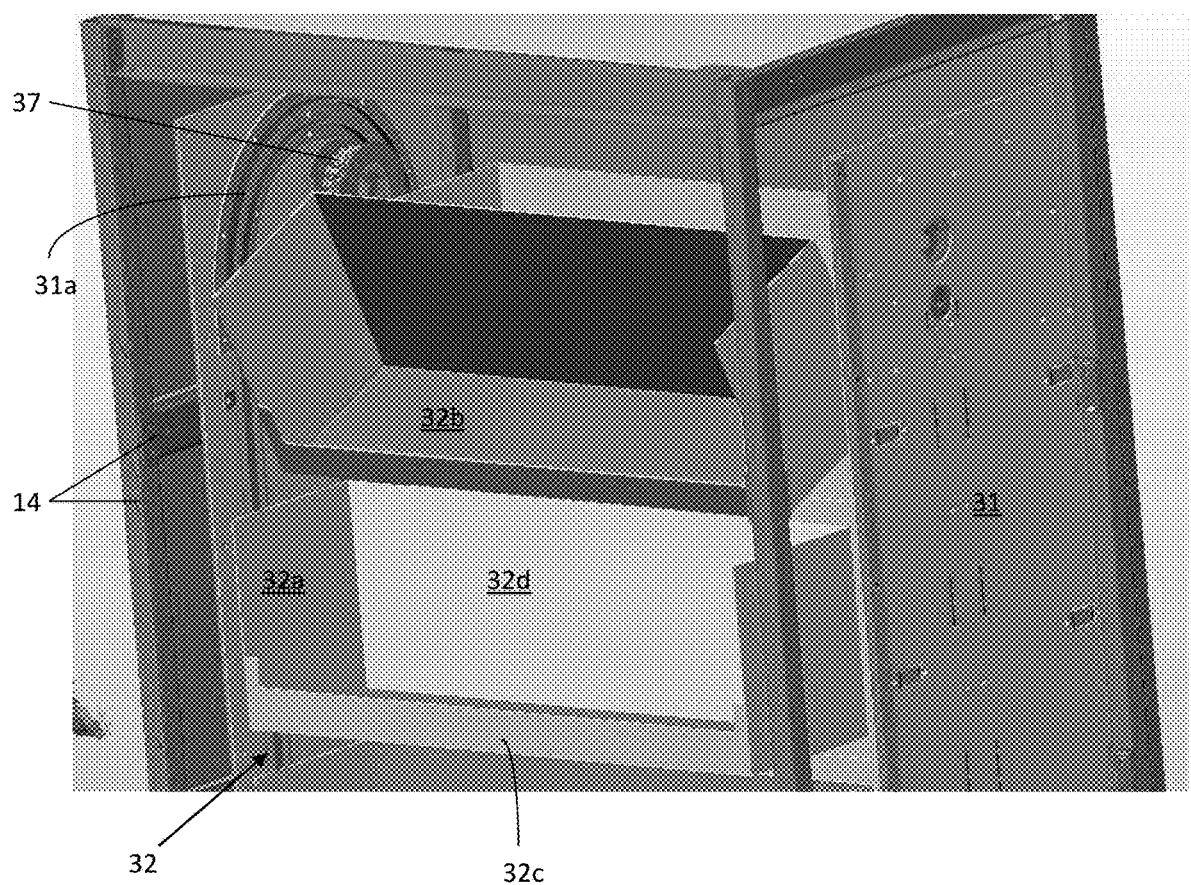
FIG. 3B provides a detailed perspective view of the top portion of the embodiment of a storage and retrieval system shown in FIGS. 1 and 3A.
Figure 3C:
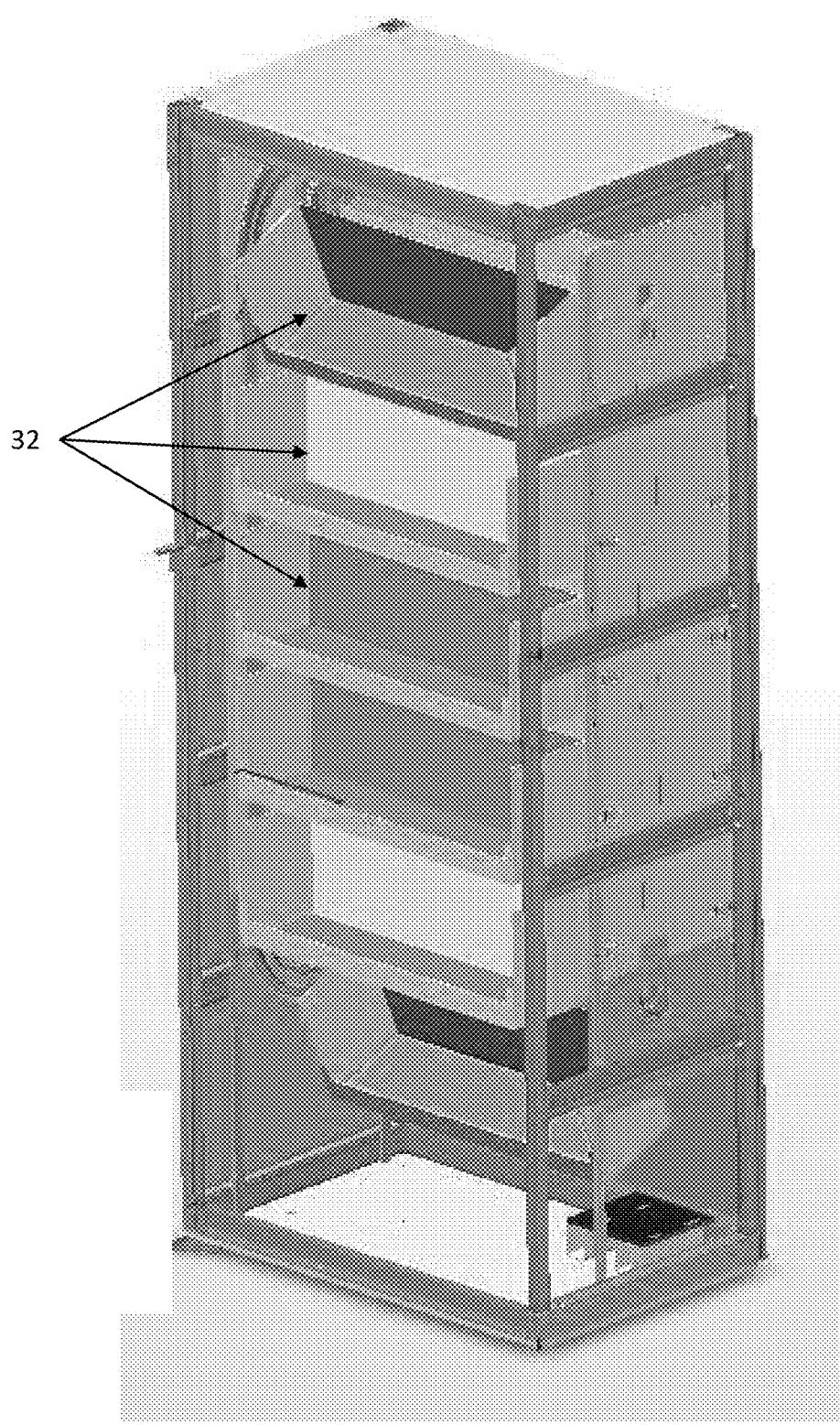
FIG. 3C provides a perspective view of the embodiment of a storage and retrieval system shown in FIG. 1 showing one illustrative embodiment of a plurality of storage members.

It is contemplated that for the illustrative embodiment, it may be advantageous to engage four generally vertically oriented frame members 12 (e.g., one at each corner of the storage and retrieval system 10) with a plurality of generally horizontally oriented frame members 12 at various positions along the height of a generally vertical frame member 12, as best shown in FIG. 3C. Accordingly, each generally horizontal frame member 12 may be engaged with at least one generally vertical frame member 12, and are shown in FIG. 3C with each end thereof engaged with different generally vertical frame members 12 such that a plurality of frame members 12 are engaged with one another to cooperate in forming a supporting frame structure for the storage and retrieval system 10. However, alterations in the structure, configuration, and/or orientation of the various frame members 12 will occur without departing from the spirit and scope of the storage and retrieval system 10 as disclosed and claimed herein.

Figure 2A:
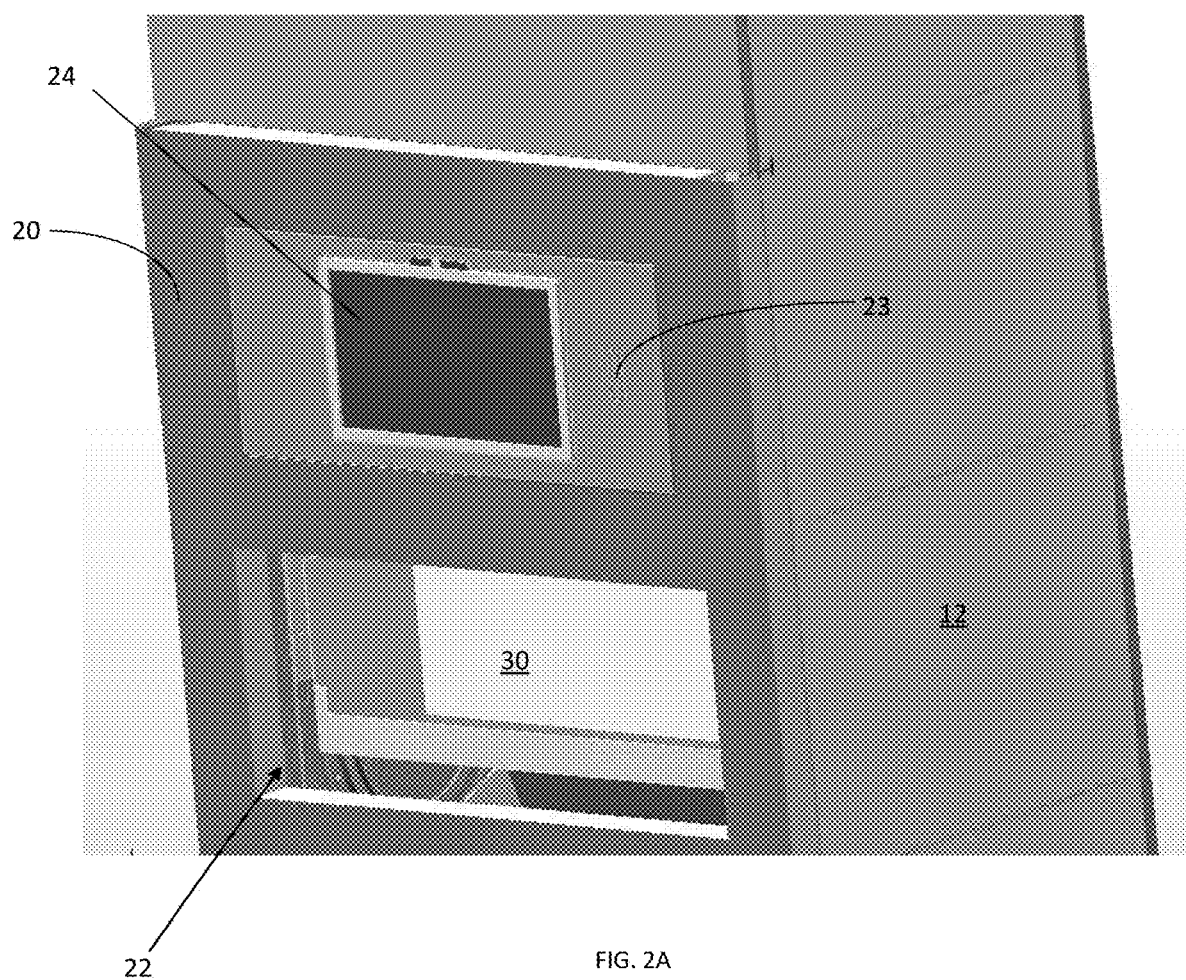
FIG. 2A provides a detailed perspective view of the embodiment of a storage and retrieval system shown in FIG. 1 adjacent an embodiment of a front exterior panel.
Figure 2B:
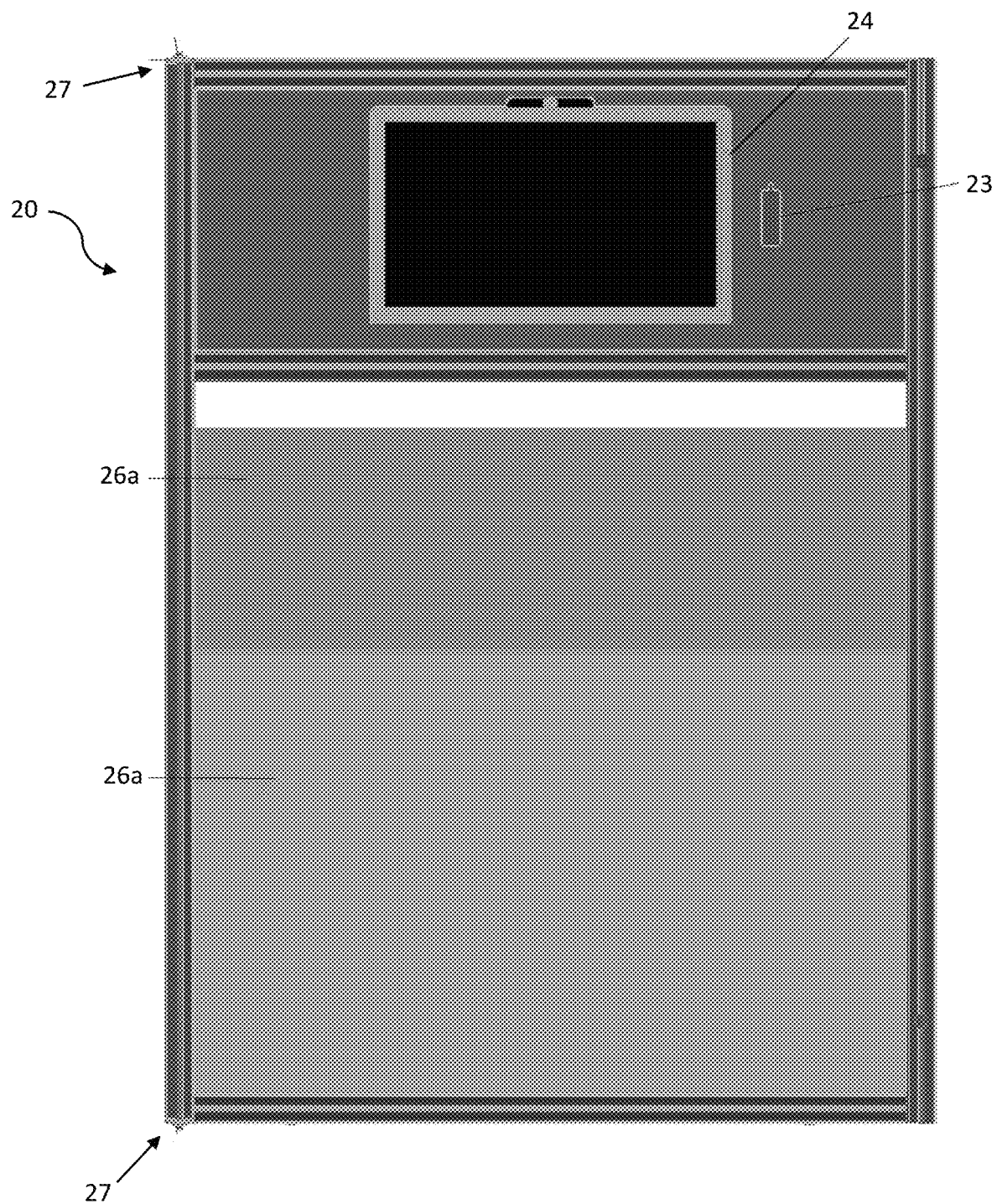
FIG. 2B provides a plain front view of the embodiment of a front exterior panel shown in FIGS. 1 and 2A.

FIG. 2A provides a detailed perspective view of the illustrative embodiment of a storage and retrieval system 10 about a first embodiment of a front exterior panel 20. The front exterior panel 20 may be engaged with one or more frame members 14 such that the front exterior panel 20 may pivot with respect to certain other elements of the storage and retrieval system 10 about one or more pivot mechanism 27, as shown in FIG. 2B. As such, the front exterior panel 20 may serve as an access or service door to the interior of the storage and retrieval system 10 in a manner similar to that of typical vending machines. Accordingly, the front exterior panel 20 may be configured with a locking mechanism (not shown) to restrict access to the interior of the storage and retrieval system 10.

The access port 22 may be configured to provide an opening that allows a user to interact with selected contents within the storage and retrieval system 10. A door flap 26 may be configured to either deny or allow access through the access port 22. In the illustrative embodiment, the door flap 26 may be configured to move in a generally vertical direction such that it slides with respect to the front exterior panel 20. As shown in FIG. 2A, the door flap 26 is in the open position, wherein the door flap 26 has slid downward to allow access to the access port 22. In other embodiments, a door flap 26 may cooperate with a lower door flap 26a. In such an embodiment the door flap 26 and lower door flap 26a may have an interface therebetween approximately at the centerline of the access port 22, wherein the door flap 26 would move upward and the lower door flap 26a would move downward to allow access to the access port 22. Alternatively, the front exterior panel 20 may be configured with right and left door flaps that move away from one another in a generally horizontal direction to allow access to the access port 22. Accordingly, the scope of the storage and retrieval system 10 is not limited by the structure and/or method used to selectively control access through the access port 22. Additionally, any structure and/or method so used may be configured as transparent to allow users to visually inspect the contents behind the access port 22 that are positioned adjacent thereto.

The door flap 26 and/or other structure and/or method used to control access through the access port 22 may be actuated (if need be) by any suitable structure and/or method suitable for the particular embodiment of the structure and/or method used to control access through the access port 22. For example, if a physical, transparent member configured as a moveable door flap 26 is used, the door flap 26 may be actuated between an open, closed, and/or partially closed position via an electrically powered actuator (e.g., solenoid) 29, pneumatic actuator 29, or any other suitable method and/or structure to provide a motive force to the door flap 26. Accordingly, the optimal structure and/or method for allowing/denying access through the access port 22 will vary from one embodiment of the storage and retrieval system 10 to the next, and is therefore in no way limiting to the scope thereof.

The front exterior panel 20 may be configured with one or more scanners 23 positioned thereon. The scanner(s) 23 may be configured as any scanner 23 that may be suitable for the particular application of the storage and retrieval system 10. For example, in a retail setting the scanner 23 may be configured as a bar code scanner or QR code scanner. In a warehouse setting, the scanner 23 may be configured as a biometric scanner, such as a retinal, fingerprint, or thumbprint scanner. Accordingly, the scope of the storage and retrieval system 10 is in no way limited by the presence of a scanner 23, the number thereof, and/or the particular type thereof.

The scanner 23 may be in communication with a locking mechanism (not shown) on the front exterior panel 20, such that recognized personnel may access the storage and retrieval system 10 not only via the access port 22, but also be opening the front exterior panel 20. Accordingly, access to the internal components of the storage and retrieval system 10 via opening of the front exterior panel 20 may be granted to a first user via the scanner 23, but denied to a second user. Simultaneously, that second user may be granted access to various items within the storage and retrieval system 10 via the access port 22, which items would most commonly be limited to the contents of specific storage members 32. However, any other configuration of a scanner 23 to allow and/or deny access to various contents and/or components of the storage and retrieval system 10 may be used therewith without limitation.

The front exterior panel 20 may also be configured with a first display 24 engaged therewith. The first display 24 may be in communication (either wired or wirelessly) with a CPU that is programmed to provide any functionality that may be desirable for the specific application of the storage and retrieval system 10. For example, if the storage and retrieval system 10 is configured for use within a retail setting, it may be advantageous to program the CPU to display a map of the retail establishment on the first display 24. Additionally, the first display 24 may be a point of user interaction if configured as a touch screen. It is contemplated that the CPU may be programmed so that the first display 24 may be configured to have a shopping cart function, which may be advantageous in a retail setting.

A second display 25 may also be mounted to the storage and retrieval system 10 above the first display 24. The second display 25 may be in communication with a CPU (which could be the same CPU in communication with the first display 24 previously mentioned) to provide content to the second display 25. It is contemplated that in a retail setting, it may be advantageous for the second display 25 to provide advertisements, which may include an audio component if the second display 25 is equipped with speakers.

As shown in FIGS. 2A & 3A, the illustrative embodiment of a storage and retrieval system 10 may include a storage assembly 30 comprising one or more storage members 32. It is contemplated that the storage assembly 30 may be positioned within the interior of the storage and retrieval system 10. The storage assemblies 32 may be of any suitable configuration for the particular application of the storage and retrieval system 10, but in the illustrative embodiment thereof may be configured primarily as shelves having one or more side surfaces 32a and a bottom surface 32b. A front ledge 32c and back wall 32c may also be employed if needed, as most clearly shown in FIG. 3B. The optimal configuration of a storage member 32 will vary from one embodiment of the storage and retrieval system 10 to the next, and will be dependent at least in part upon the contents to be placed in each storage member 32. One storage and retrieval system 10 may be configured with differently configured storage members 32, or all storage members 32 may be configured the same. Accordingly, the specific configuration of the storage members 32 in no way limits the scope of the storage and retrieval system 10.

Figure 5:
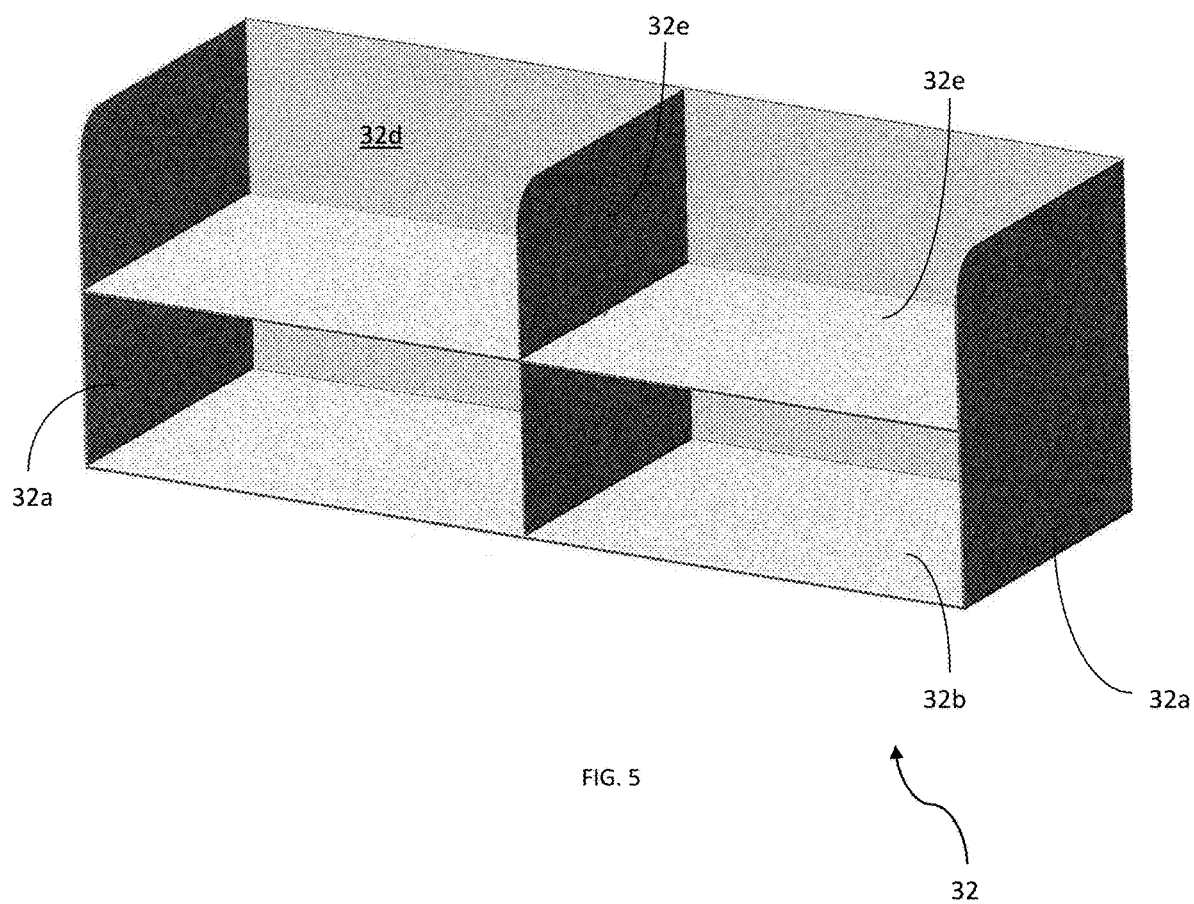
FIG. 5 provides a perspective view of a second embodiment of a storage member 32 that may be used with various embodiments of the storage and retrieval system.

A second embodiment of a storage member 32 is shown in FIG. 5. This embodiment of a storage member may be configured with multiple partitions 32e to accommodate items of varying size and/or shape on a single storage member 32. It is contemplated that the various partitions 32e may be removable and/or configured in a variety of orientations without limitation. Additionally, any storage member 32 may be configured with biasing members (not shown), such as springs, which biasing members serve to urge items away from the back wall 32d for easier access to the items through the access port 22. Any storage member 32 may also be configured such that only one of a plurality of items on a given storage member 32 is accessible through the access port 22. Such singular access to a plurality of items may be accomplished via any suitable structure and/or method for the particular embodiment of the storage and retrieval system 10. Such structures and/or methods include but are not limited to screw members, locking boxes, etc. Accordingly, the presence and/or specific structure and/or method for singular access to a specific item from a plurality of items on a given storage member 32 in no way limits the scope of the storage and retrieval system 10 as disclosed and claimed herein.

Figure 6:
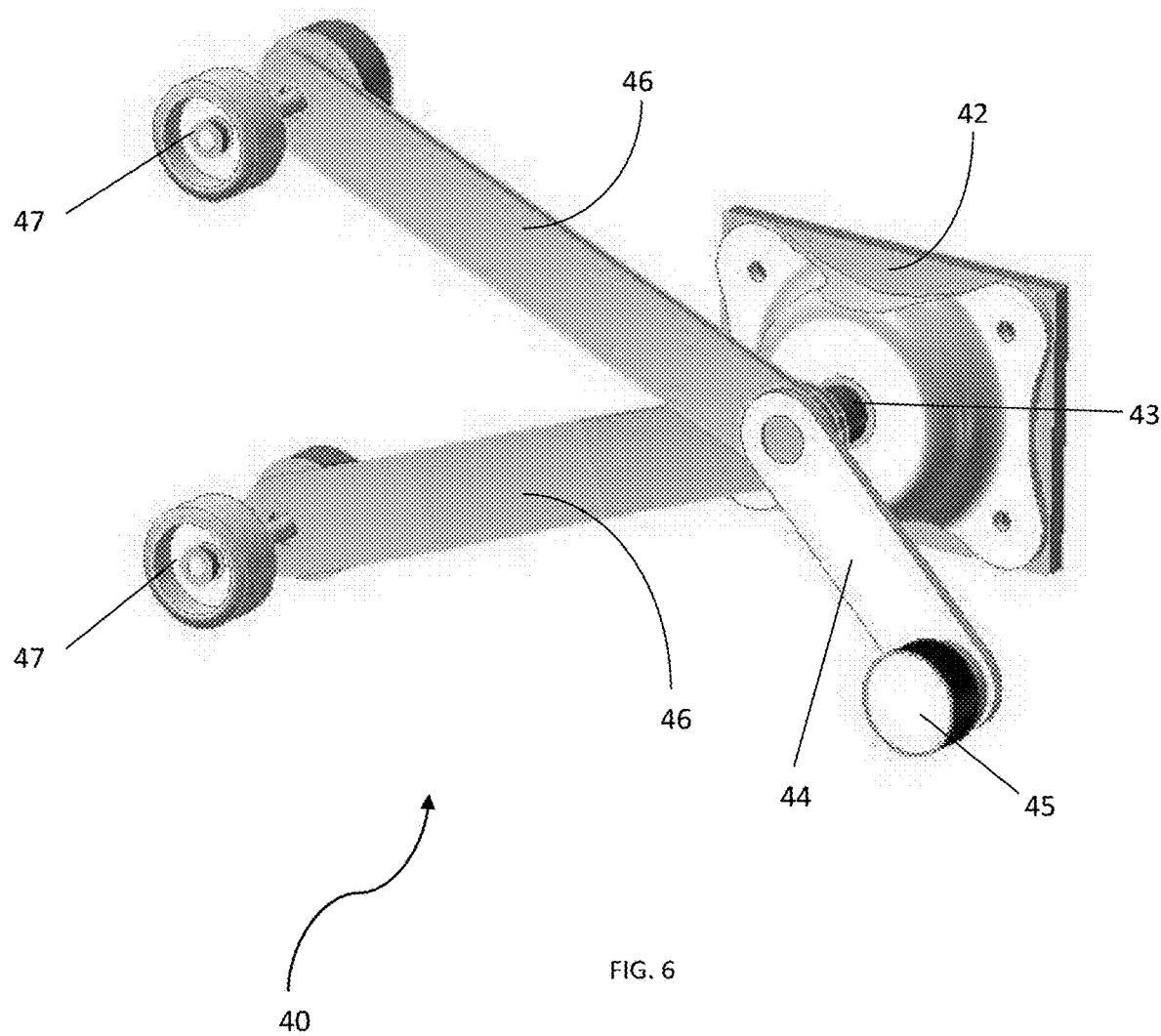
FIG. 6 provides a detailed perspective view of an illustrative embodiment of a positioning assembly that may be used with the storage and retrieval system.

A storage member 32 may be configured to interact with the storage assembly 30 in any manner suitable for the particular application of the storage and retrieval system 10. One embodiment of a positioning assembly 40 as shown in FIG. 6 may comprise a plate 42 for engagement with a storage member 32. In the illustrative embodiment it is contemplated that the plate 42 may engage the storage member 32 on the exterior of the side surface 32a, and that a positioning assembly 30 may be engaged with one or both side surfaces 32a of a storage member 32.

The positioning assembly 40 may be formed with a pin 43 extending from the plate 42, wherein the pin 43 may be securely engaged with the plate 42 such that neither may rotate with respect to the other. A fixed arm 44 may be engaged with the pin 43 such that the fixed arm 44 does not rotate with respect to the pin 43 (and consequently with respect to the plate 42 and storage member 32 with which the plate 42 is engaged). The distal end of the fixed arm 44 may be configured as a roller 45 for placement within the guide 31a, such that the roller 45 may move along the guide 31a with minimal friction/resistance. The roller 45 and/or guide 31a may be formed of complimentary materials to reduce the friction therebetween, which materials include but are not limited to Teflon®, polymers, natural materials, other materials, and/or combinations thereof.

The positioning assembly 40 may also include one or more pivot arms 46 that may be pivotally engaged with the pin 43 at a first end of the pivot arm 46. The distal end of the pivot arm 46 may be formed as a connector 47 and engaged with the coupling member 37, which engagement may also be in a pivotal manner. However, in the illustrative embodiment of a positioning assembly 40 it is contemplated that the connector 47 may advantageously engage the coupling member 37 in a non-pivotal, rigid arrangement. In this manner, the mechanical energy from the drive member 36 may be communicated to a storage member 32 first through a coupling member 37 and then through one or more pivot arms 46 of a positioning assembly 40 engaged with the storage member 32. Accordingly, the storage member 32 and positioning assembly 40 may be configured such that the orientation of the fixed arm 44 with respect to the storage member 32 and the shape of the guide 31a determine the orientation of the storage member 32 with respect to the side plates 31, front exterior panel 20, frame members 14, etc. However, other structures and/or methods may be used to determine the orientation of a storage member 32 with respect to other elements of the storage and retrieval system 10 without departing from the spirit and scope thereof.

Using the illustrative embodiment of a positioning assembly 40 shown in FIG. 6, the storage assembly 30 may be configured to vary the yaw, pitch, and/or roll of a storage member 32 at a specific position along the guide 31a. For example, adjusting the shape of the guide 31a in the fore/aft dimension (from a vantage in front of the front exterior panel 20) may cause a storage member 32 to tilt forward for a certain length of the guide 31a. Such a configuration may be advantageous for ensuring that items positioned on a storage member 32 are located away from the back wall 32d of the storage member 32.

The storage assembly 30 may be configured to indexably move a plurality of storage members 32 about a predetermined path, wherein each storage member 32 may pause in an area adjacent the access port 22 such that a user may view and/or interact with the contents positioned on that particular storage member 32. One or more storage members 32 may be engaged with one another via a coupling member 37. In the illustrative embodiment of a storage assembly 30, the coupling member 37 may be configured as a link chain, belt, and/or any other structure that is suitable to communicate motive forces from a drive member 36 to a storage member 32 and/or from one storage member 32 to another.

The illustrative embodiment of a storage and retrieval system 10 with various exterior panels 12, frame members 14, and the front exterior panel 20 removed for clarity is shown in FIG. 3C. In the illustrative embodiment, the storage assembly 30 may be configured such that a plurality of storage members 32 is moveable within a generally elliptical circuit. To facilitate movement of the storage members 32, the storage assembly 30 may be configured with a drive member 36 and a coupling member 37. It is contemplated that the drive member 36 may be mounted within the storage and retrieval system 10, but it may be mounted exterior thereto without limitation.

In the illustrative embodiment of the storage assembly 30, the drive member 36 may be configured as a sprocket engaged with a motive energy source (not shown), such as an electric or pneumatic motor. However, in other embodiments the motive energy source may be integrally formed with the drive member 36. In the illustrative embodiment of the storage assembly 30, the drive member 36 may be engaged with a sprocket, pulley, and/or any other structure that is suitable to communicate a motive force to one or more storage members 32 and/or coupling member 37.

Figure 4A:
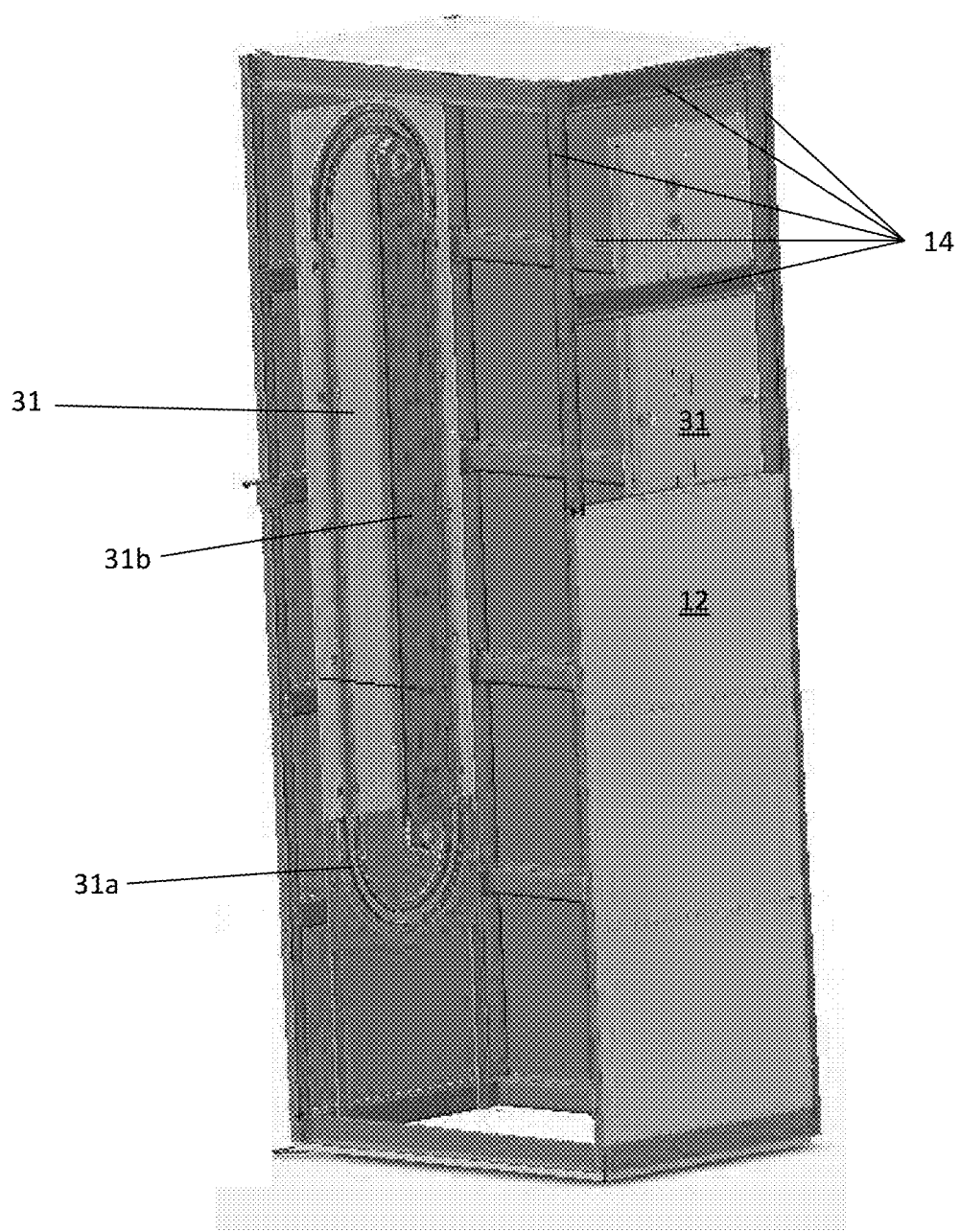
FIG. 4A provides a perspective view of the embodiment of a storage and retrieval system shown in FIGS. 1 and 2A wherein various exterior panels and elements of the storage assembly have been removed for clarity.
Figure 4B:
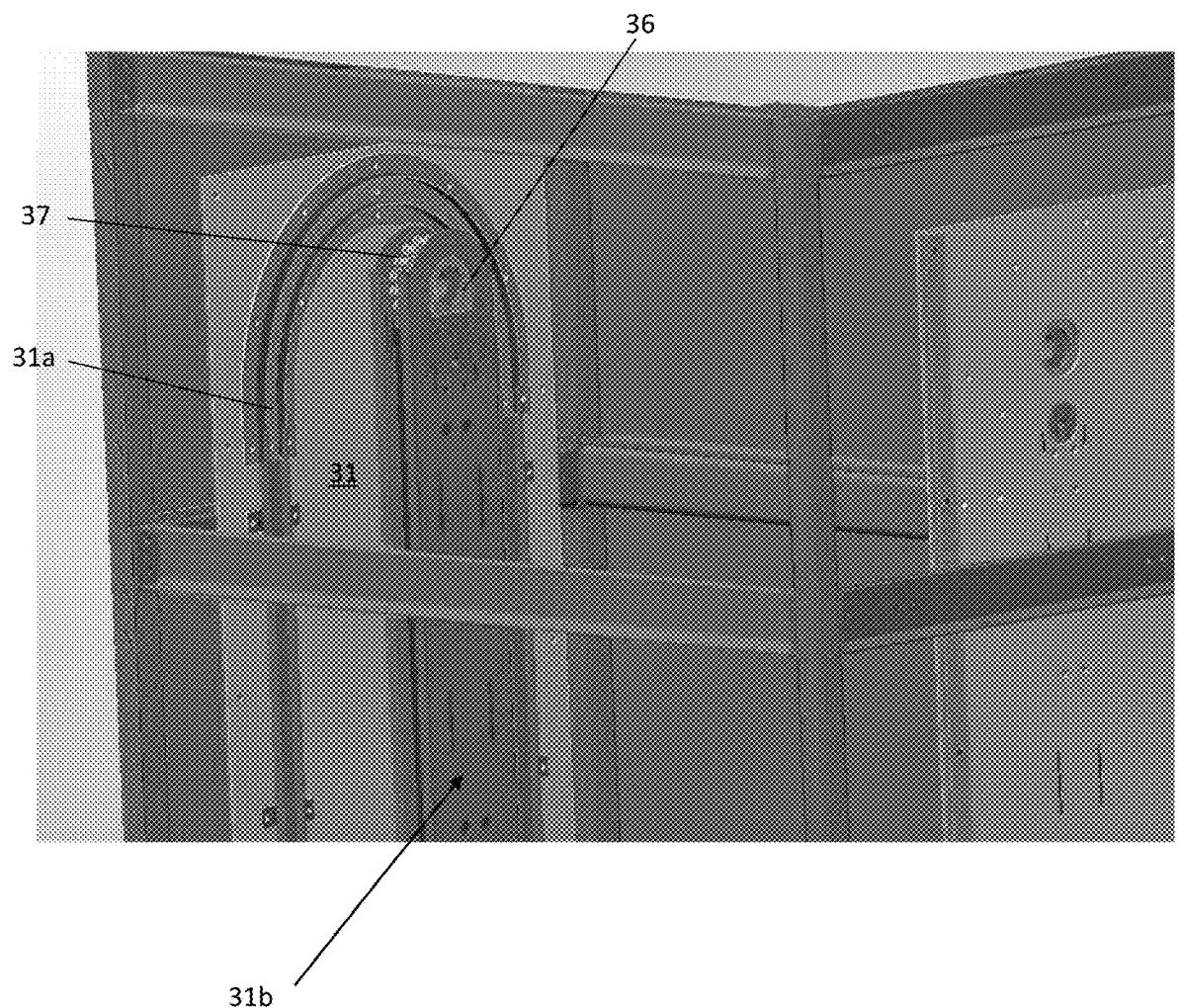
FIG. 4B provides a detailed perspective view of the top portion of the embodiment of a storage and retrieval system as shown in FIG. 4A.

The illustrative embodiment of a storage assembly 30 mounted within a plurality of frame members 14 is shown in perspective in FIG. 4A. As may be seen in FIG. 4A, one or more side plates 31a may be engaged with one or more frame members 14. A detailed view of the top portion of the illustrative embodiment of a storage assembly 30 is shown in FIG. 4B. Each side plate 31 may be formed with a guide 31a therein. Generally, the guide 31a may be configured to dictate the shape and constraints of the circuit for the storage members 32. Accordingly, in the illustrative embodiment the guide 31a may be generally elliptically shaped, but the scope of the storage and retrieval system 10 is not so limited and extends to any shape and/or configuration of a guide 31a without limitation.

As shown in FIGS. 4A & 4B, a drive keeper 31b may be engaged with the side plate 31 on the interior portion thereof. In the illustrative embodiment, the drive keeper 31b may be configured as a track and/or pathway in which the coupling member 37 may reside and may also provide an engagement location for the drive member 36. The drive keeper 31b may be configured such that the coupling member 37 and/or drive member 36 are fully enclosed within the drive keeper 31b to mitigate the possibility of foreign objects interfering with the operation of either the coupling member 37 and/or drive member 36.

Various safeguards and/or other safety features may be integrated into the access port 22 to protect contents of the storage and retrieval system 10 and/or personnel using the storage and retrieval system 10. For example, in the illustrative embodiment it is contemplated that an invisible light curtain system may be projected across the access port 22. The structure and/or method controlling access to the access port 22 may be in communication with a logic circuit that is also in communication with the drive member 36 and/or light curtain system (which may reside on a central CPU in communication with other electrical components of the storage and retrieval system 10). The logic circuit may be configured such that if the light curtain system detects an object within the access port 22, the drive member 36 and/or structure and/or method controlling access to the access port 22 may be immobilized. Such a safeguard would mitigate the likelihood of the storage assembly 30 becoming inadvertently energized when a user is attempting to interact with a storage member 32 and/or other object through the access port 22.

Another safeguard that may be incorporated into the access port 22 to protect items and/or users is a pressure sensor(s) 28 placed along the edge of the door flap 26 and/or lower door flap 26b. The pressure sensor(s) 28 may be in communication with a CPU and/or logic circuit that is simultaneously in communication with the structure and/or method for actuating the door flap 26 and/or lower door flap 26a. Accordingly, if the pressure sensor 28 experiences a pressure beyond a predetermined set point, the CPU and/or logic circuit may cause the direction of the door flap 26 and/or lower door flap 26a to reverse.

Additionally, each storage member 32 may be configured with a touch and/or pressure sensor(s) (not shown) along a portion thereof. These various sensors may be in communication with a CPU and/or logic circuit that is simultaneously in communication with the structure and/or method for actuating the door flap 26 and/or lower door flap 26a. Accordingly, the sensors on the storage members 32 experience touch and/or pressure at a predetermined amount, the drive member 36 may become idle such that the storage members 32 do not inadvertently move. Sensors on the storage members 32 may also provide a safeguard against items inadvertently falling from the storage member 32 into an area in which it may interfere with the internal components of the storage and retrieval system 10.

Finally, an emergency stop switch (not shown) may be positioned in a readily accessible position on the exterior of the storage and retrieval system 10. It is contemplated that the emergency stop switch may be in direct communication with the power supply for the storage and retrieval system 10 and/or the drive member 36. Accordingly, depending on the configuration of the emergency stop switch, pressing the emergency stop switch may cause the entire storage and retrieval system 10 to power off, or it may immobilize the storage assembly 30 such that now storage members 32 can move. It is contemplated that the CPU and/or logic circuit in communication with the various sensors of the storage and retrieval system 10 may be configured such that in the event that one of the sensors and/or switches fails and/or provides any indication that it is malfunctioning, the CPU and/or logic circuit will default to a power down/immobilization state for the drive member 36 such that the storage members 32 do not move.

It is contemplated that the various features/aspects/components of the storage and retrieval system 10 may communicate with one another for optimal ease of use. For example, the scanner 23 and first display 24 and/or second display 25 may work in conjunction such that a user may bring empty packaging having a bar code, scan the bar code with the scanner 23, and thereby cause the first display 24 and/or second display 25 to show the location of that item on a store map (or indicate whether a similar item is available in the storage and retrieval system 10 itself). Additionally, the scanner 23 and first display 24 and/or second display 25 may work in conjunction such that when a user scans a bar code or product code, more information, advertisements, alternatives, etc. are displayed on the first display 24 and/or second display 25.

The storage and retrieval system 10 may also be configured with a radio frequency identification (RFID) system. Such an embodiment may provide real time inventory of items within the storage and retrieval system 10, as a sensor (not shown) may be located adjacent the access port 22 such that a CPU in communication with the RFID system will update the quantity of items within the storage and retrieval system 10 when an item having an RFID tag is removed through the access port 22. An administrative user may update the quantity of items during restocking or other actions that require the front exterior panel 20 to be opened/unlocked.

The storage and retrieval system 10 may also be configured with a magnetic strip reader, such as one used in credit card and/or debit card transactions. If the first display 24 is configured as a touchscreen, a virtual keypad may be displayed by a properly programmed CPU in communication with the first display 24. If so equipped, the storage and retrieval system 10 may serve as a point-of-sale device, wherein a customer may select and item to purchase, pay for the item, and then remove the item through the access port 22 without need for additional personnel and/or interactions. To navigate the contents displayed on the first display 24, the storage and retrieval system 10 may be configured with a trackball positioned adjacent the first display but at a height that is accessible from a wheelchair.

A CPU in communication with the storage assembly 30 and/or drive member 36 may be programmed so that when a user desires access to storage member 32 that is not adjacent the access port 22, the drive member 36 moves the coupling member 37 either clockwise or counterclockwise, depending on the shortest path from the desired storage member 32 to the access port 22.

If the storage and retrieval system 10 is configured for use with foodstuffs, or with other items requiring a controlled climate, the storage and retrieval system 10 may be configured with an HVAC system (not shown). The HVAC system may be configured to control the temperature, humidity, and/or other environmental characteristics within the storage and retrieval system 10. The storage and retrieval system 10 may also be configured with a microwave, toaster, toaster oven, and/or other food preparation components adjacent or within the front exterior panel 20 as suitable for the particular application of the storage and retrieval system 10.

Alternative Illustrative Systems and Methods

A storage and retrieval system 10 and/or vending storage and retrieval system 110 configured according to one or more aspects of the present disclosure may be in communication with one or more sets of machine executable code (software), all or a portion of which may reside on the storage and retrieval system 10 and/or vending storage and retrieval system 110 locally, or all or a portion of which may reside on a computing and/or memory device located remotely from the storage and retrieval system 10 and/or vending storage and retrieval system 110 and in communication therewith in either a wired or wireless manner. For simplicity, the following description will make reference simply to a vending storage and retrieval system 110. However, the following description is in no way limited to only a vending storage and retrieval system 110 unless so indicated in the following claims. Various aspects of a vending storage and retrieval system 110 and software that may be used in conjunction therewith is found in Appendix A, which is attached hereto and made a part of this disclosure.

Figure 13:
FIG. 13 provides a front view of a vending storage and retrieval system that may be used with the GUI shown in FIG. 12.
Figure 14A:
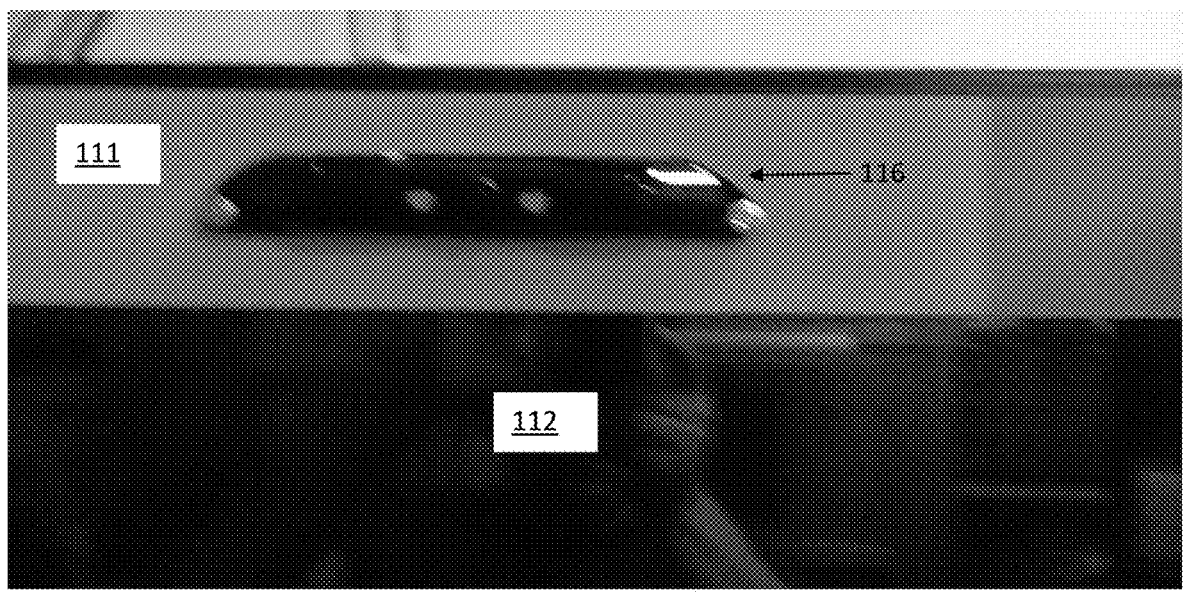
FIG. 14A provides a detailed view of a portion of the vending storage and retrieval system shown in FIG. 13 adjacent a camera.
Figure 14B:
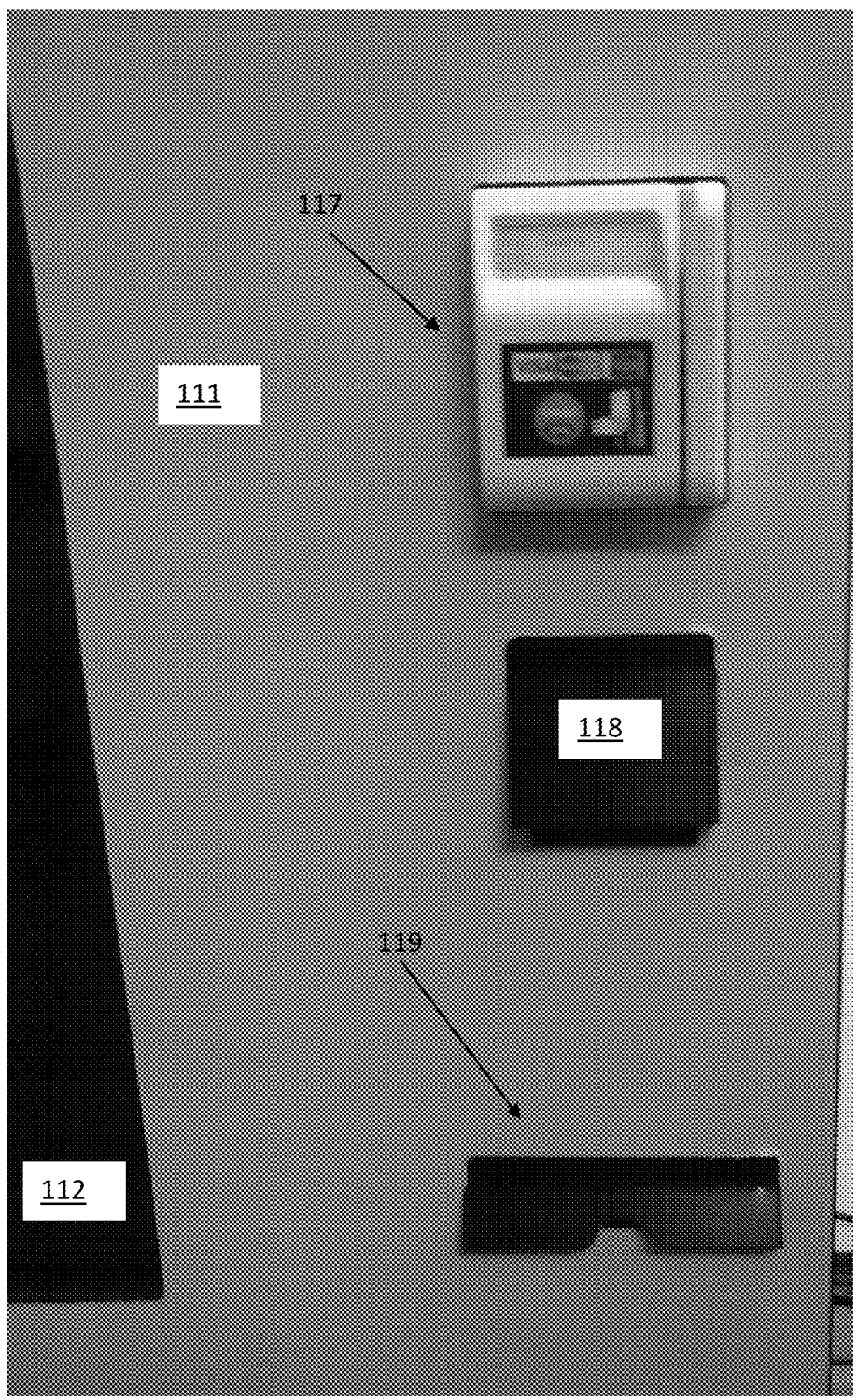
FIG. 14B provides a detailed view of a portion of the vending storage and retrieval system shown in FIG. 13 adjacent a card reader, scanner, and receipt port.

The vending storage and retrieval system 110 in communication with software may be similar to those previously disclosed herein, or may be differently configured, such as the vending storage and retrieval system 110 shown in FIGS. 13, 14A, and 14B. Generally, it is contemplated that an aspect of such a vending storage and retrieval system 110 may be to provide a vending machine with a multi-media touch experience facilitated though a screen 112 as described in further detail below, and which screen 112 may be used to display one or more GUIs generated in whole or in part by software associated with a vending storage and retrieval system 110.

In an aspect, the software in cooperation with a vending storage and retrieval system 110 according to the present disclosure may be configured as a shopping cart-based vending machine that may allow purchase via credit card, among other types of payment, including but not limited to cash, coin, and/or mobile phone payment protocols without limitation unless so indicated in the following claims. Additionally, the software may be configured to allow an administrator to place restrictions upon the purchase of an item in the vending storage and retrieval system 110 via driver's license and/or other government-issued identification and/or camera-estimated age verification. It is contemplated that age verification may aide in collection of demographic data as well as allow for age-restricted products to be offered via a vending storage and retrieval system 110 with minimal employee and/or other human oversight.

A vending storage and retrieval system 110 may be configured with various hardware components in communication with the screen 112 (which may be a touch-operated screen 112). It is contemplated that a vending storage and retrieval system may be configured with a housing 111, and that all or a portion of some of the hardware components in communication with the screen 112 may be positioned in an internal portion of the vending storage and retrieval system 110. Further, it is contemplated that internal shelving may be positioned within the housing 111 to store various items as inventory within a vending storage and retrieval system 110, and that automated collecting assembly (e.g., machinery capable of collecting and/or retrieving a specific item from a specific location on a specific shelf) may also be positioned within the housing 111 to retrieve and/or collect specific items based on input from a user and/or purchaser, and/or based on commands from software associated with the vending storage and retrieval system 110. That is, the collecting assembly may be controlled by software associated with the vending storage and retrieval system 110 such that upon certain conditions (e.g., a purchase), the collecting assembly may collect a specific item within the housing 111 and place it adjacent a dispensing port 114, at which time a user and/or purchaser external to the housing 111 may reach into the dispensing port 114 to access the item. The shelving and collecting assembly within the housing 111 may be of the type commonly used in prior art vending machines, or it may be of the type described herein above without limitation unless so indicated in the following claims.

Generally, a vending storage and retrieval system 110 and associated software may be configured to make purchasing an item relatively fast and simple, while simultaneously creating and/or maintaining an opportunity for a purchaser and/or user to interact with a vending storage and retrieval system 110 in a more meaningful way than as was possible in the prior art. This increased interaction may facilitate collection of data, such as demographics of customer of a particular product and/or products, which may allow for more accurate targeted advertisements and/or marketing (which may provide a revenue stream) in the form of visual and/or audio advertisements. Additionally, it is contemplated that a vending storage and retrieval system 110 may have generally standardized hardware components, but that the associated software may be configured to allow opportunities for custom development for different applications of a vending storage and retrieval system 110, such custom development including but not limited to different settings for the software, web-based application access, and/or different libraries that interface into licensed-use source code.

One or more cameras 116 in communication with a vending storage and retrieval system 110 may be configured to anonymously collect age/gender information on the customers who visit the vending storage and retrieval system 110, allowing the vending storage and retrieval system 110 owner to collect, review, and/or otherwise use the demographics of users and/or purchasers during specific dates, times, for specific products, and/or any other information. As shown in FIGS. 13 and 14A, one or more cameras 116 may be mounted to the exterior of a vending storage and retrieval system 110. It is contemplated that in an aspect, at least one camera 116 may be configured to capture and/or record images and/or video from an area a user and/or purchaser would typically be positioned when interacting with the screen 112. Accordingly, at least one camera 116 may be positioned above the screen 112. Another camera 116 may be configured to capture and/or record images and/or video from one or more persons passing by the vending storage and retrieval system 110, while yet another camera may be configured to capture and/or record images and/or video from one or more persons positioned adjacent to and/or interacting with the dispensing port 114, card reader 117, scanner 118, and/or receipt port 119 without limitation unless so indicated in the following claims. Finally, it is contemplated that a camera 116 and/or touch surface of a vending storage and retrieval system 110 may be configured with one or more biometric capabilities, including but not limited to finger print readers, retinal scanners, facial recognition, and/or combinations thereof.

Various hardware components, all or a portion of which may be positioned in the housing 11 include but are not limited to a central processing unit, digital memory, USB ports and/or controllers, wireless communication hardware (e.g., 802.11n/g/b/ac, Bluetooth, mobile data CDMA, TDMA, etc.), wired communication hardware (e.g., Ethernet hardware), cashless transaction hardware (e.g., card reader 117, which may be configured as an Iris Connect Telemetry Unit and/or Iris Card Reader and which may accept chip-enabled cards), scanner (e.g., a barcode scanner, QR scanner, etc., which may be configured as a Motorola DS457 Barcode Reader, one or more cameras 116 (which may be configured as E-Con 5 Megapixel Auto Focus Camera, any analog camera with an A/V or S-Video output), analog to digital video converter (which may be configured as a Sabrent USB-AVCPT), a receipt printer (which may be configured as a Zebra KR203), a relatively small form-factor PC (which may be configured as an Intel NUC DC3217IYE, but which may be other types of PCs having a quad core processor, preferably with a Core 13 minimum specification), and/or audio speakers. The specific hardware components present in any aspect of a vending storage and retrieval system 110 may vary from one application thereof to the next, and are therefore in no way limiting to the scope thereof unless so indicated in the following claims. Additionally, all of the various hardware components may be in communication with one or more other hardware components of a vending storage and retrieval system 110 without limitation unless so indicated in the following claims.

Generally, it is contemplated that a vending storage and retrieval system 110 and associated software may be configured for either outdoor or indoor use, and that the exterior of the vending storage and retrieval system 110 may be customizable for any color, finish, decals, logos, paint schemes, etc. without limitation unless so indicated in the following claims.

The vending storage and retrieval system 110 may be configured such that various standard electric energy supplies may provide the power that the vending storage and retrieval system 110 requires (e.g., 120V, 240V AC power outlet). However, the scope of the vending storage and retrieval system 110 and associated software disclosed herein is not limited by the power supply used therewith unless so indicated in the following claims. It is contemplated that existing software and/or firmware may be required to achieve the desired functionality of the vending storage and retrieval system 110, which software and/or firmware may be as disclosed in Section 2.1 of the attached Appendix A without limitation unless so indicated in the following claims.

In an aspect, the hardware components of a vending storage and retrieval system 110 and associated software and/or firmware may be selected based on the functionality desired for the vending storage and retrieval system 110. It is contemplated that some users and/or administrators may desire the vending storage and retrieval system 110 to sell items that may need age restriction, sell items using one or more cashless payment options, and/or sell dynamic advertising space (which may be via the screen 112, and the content of which advertising may be based at least on age and/or gender demographics that may be collected via the vending storage and retrieval system 110).

It is contemplated that third party vendors and/or end customers may have characteristics as described in Section 2.1 of Appendix A as attached hereto, and that additional functionality as described therein may be added to a vending storage and retrieval system 110 without limitation unless so indicated in the following claims. Furthermore, it is contemplated that general constraints to the design and/or implementation of a vending storage and retrieval system 110 and/or software in cooperation therewith may be similar to those found in Section 2.2 of Appendix A as attached hereto without limitation unless so indicated in the following claims. It is further contemplated that the design decisions and/or strategies for a vending storage and retrieval system 110 and associated software may be those described in Section 3 of Appendix A attached hereto without limitation unless so indicated in the following claims.

Figure 7A:
FIG. 7A provides an illustrative depiction of a GUI that may be used with a storage and retrieval system and method.

The vending storage and retrieval system 110 and associated software illustrated in FIGS. 7A-14B and according to the present disclosure may be configured such that retrieval and/or distribution of an item from the vending storage and retrieval system 110 occurs in two phases: (1) item selection and (2) checkout. As shown in Section 4.1 of the attached Appendix A, in an aspect, the vending storage and retrieval system 110 may be configured with a touch-screen display. In an aspect, the software associated with a vending storage and retrieval system 110 may be configured with a main screen, one illustrative depiction of a GUI for which is shown in FIG. 7A. Unless otherwise noted herein, it is contemplated that any GUI referenced throughout this disclosure may be displayed on all or part of a screen 112 of a vending storage and retrieval system 110. The main screen may be configured to display one or more products available for retrieval/purchase in the vending storage and retrieval system 110. In an aspect, the software associated with the vending storage and retrieval system 110 may be configured so as to cause the main screen to display an advertisement based on the age, gender, and/or other characteristics of a user and/or purchaser detected by a camera 116 in communication with the vending storage and retrieval system 110.

Figure 7B:
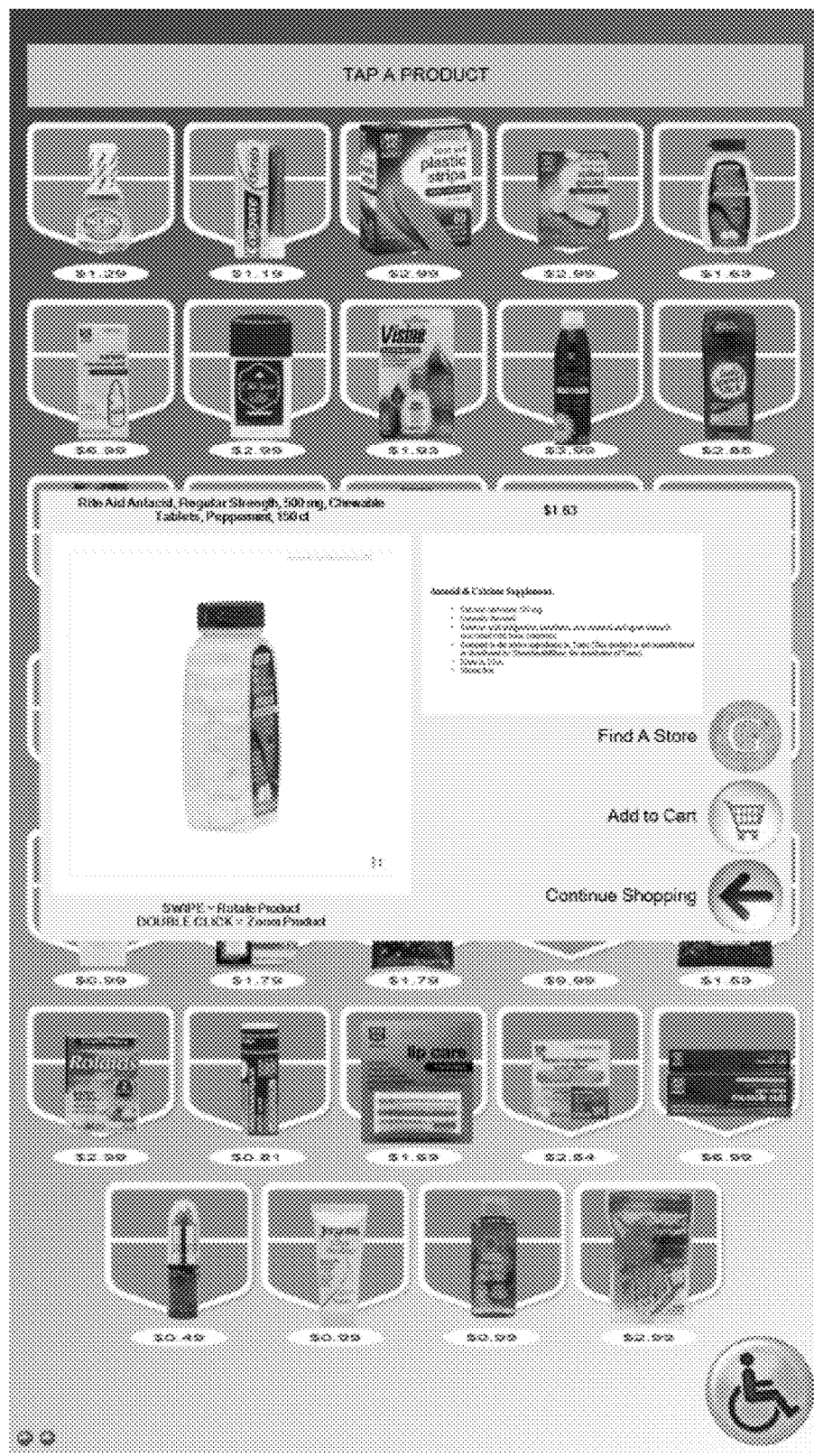
FIG. 7B provides an illustrative depiction of another GUI that may be used with a storage and retrieval system and method.
Figure 7C:
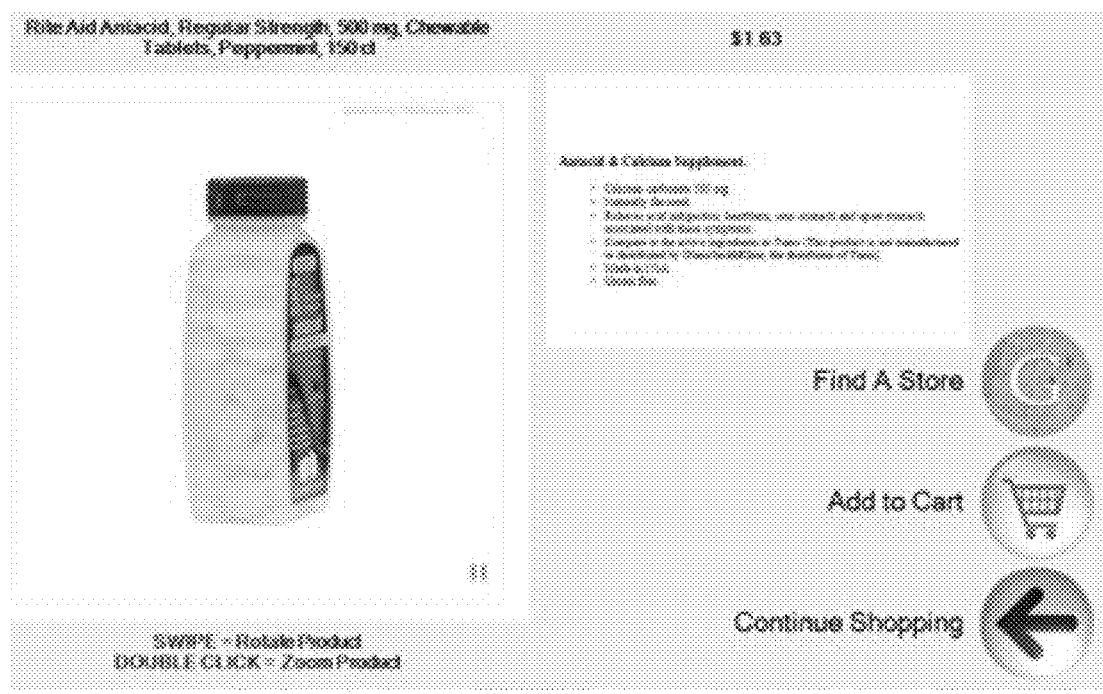
FIG. 7C provides an illustrative depiction of another GUI that may be used with a storage and retrieval system and method.

In an aspect, the software associated with the vending storage and retrieval system 110 may be configured such that selecting a product from a main screen may cause a product description screen to open, one illustrative depiction of a GUI for which is shown in FIG. 7B and in further detail in FIG. 7C. The product description screen may provide a user and/or purchaser with the option to add the product to a shopping cart. The software may be configured to exit the product description screen and/or display a different screen after a specific amount of time of inactivity and/or other conditions, such as a user and/or purchaser input. The product description screen may also provide the user and/or purchaser with the options of, including but not limited to, viewing a map of a store, viewing a map of an area adjacent one or more additional storage and retrieval systems 10, and/or viewing a plan-o-gram screen.

Figure 8A:
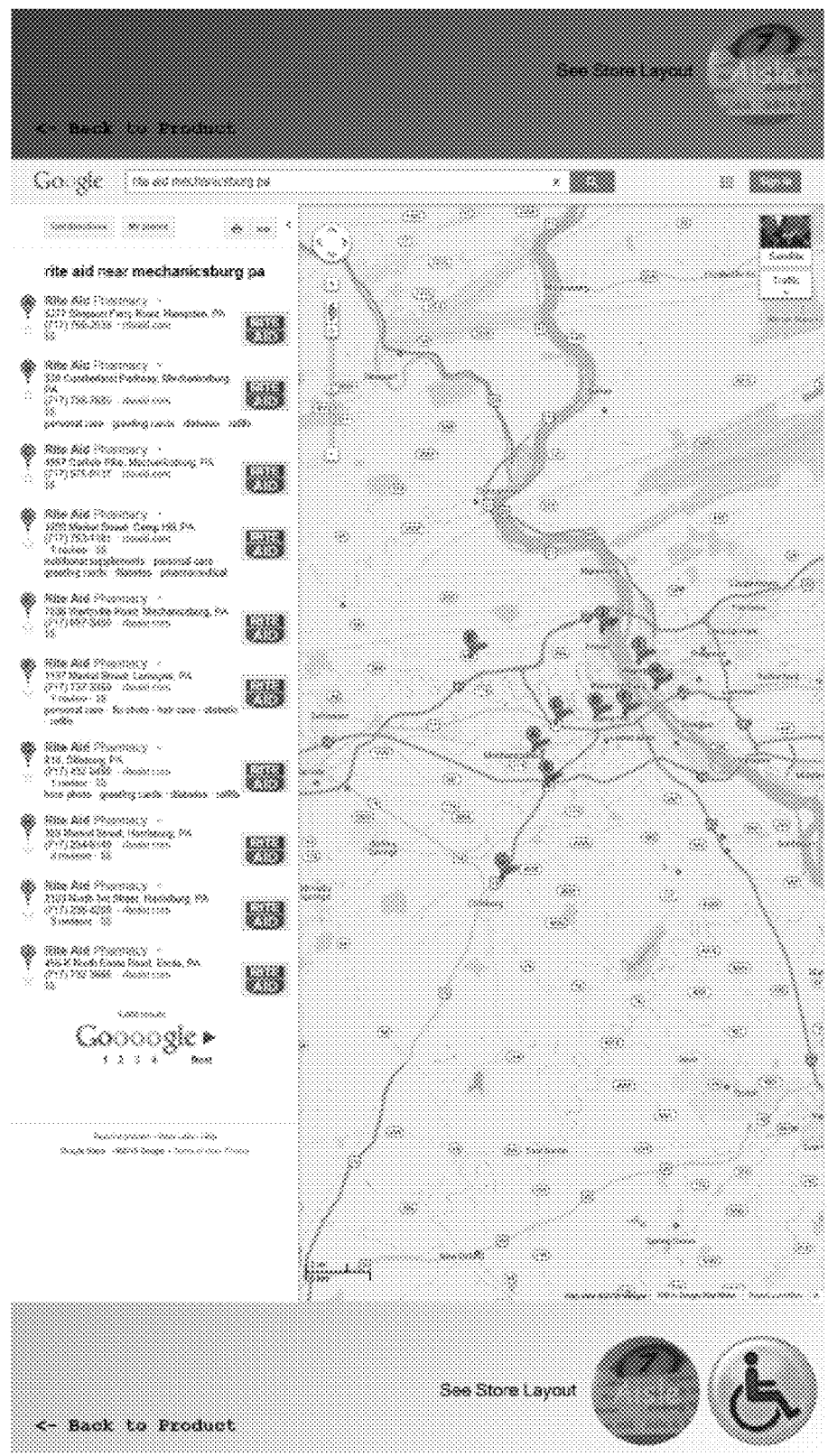
FIG. 8A provides an illustrative depiction of a GUI that may be used with a storage and retrieval system and method, wherein a portion of the GUI may include a map.
Figure 8B:
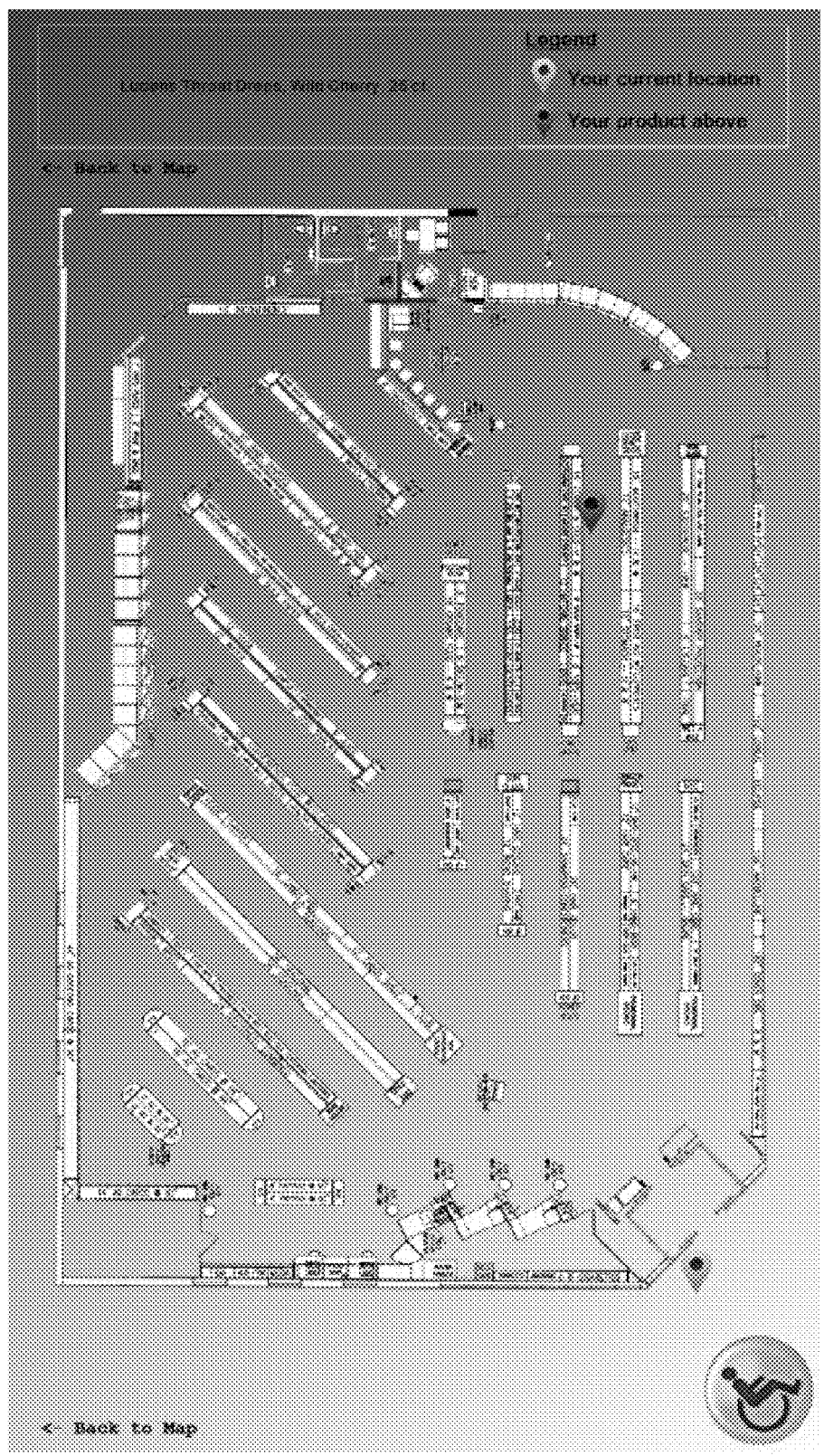
FIG. 8B provides an illustrative depiction of another GUI that may be used with a storage and retrieval system and method, wherein a portion of the GUI may include a map.
Figure 8C:
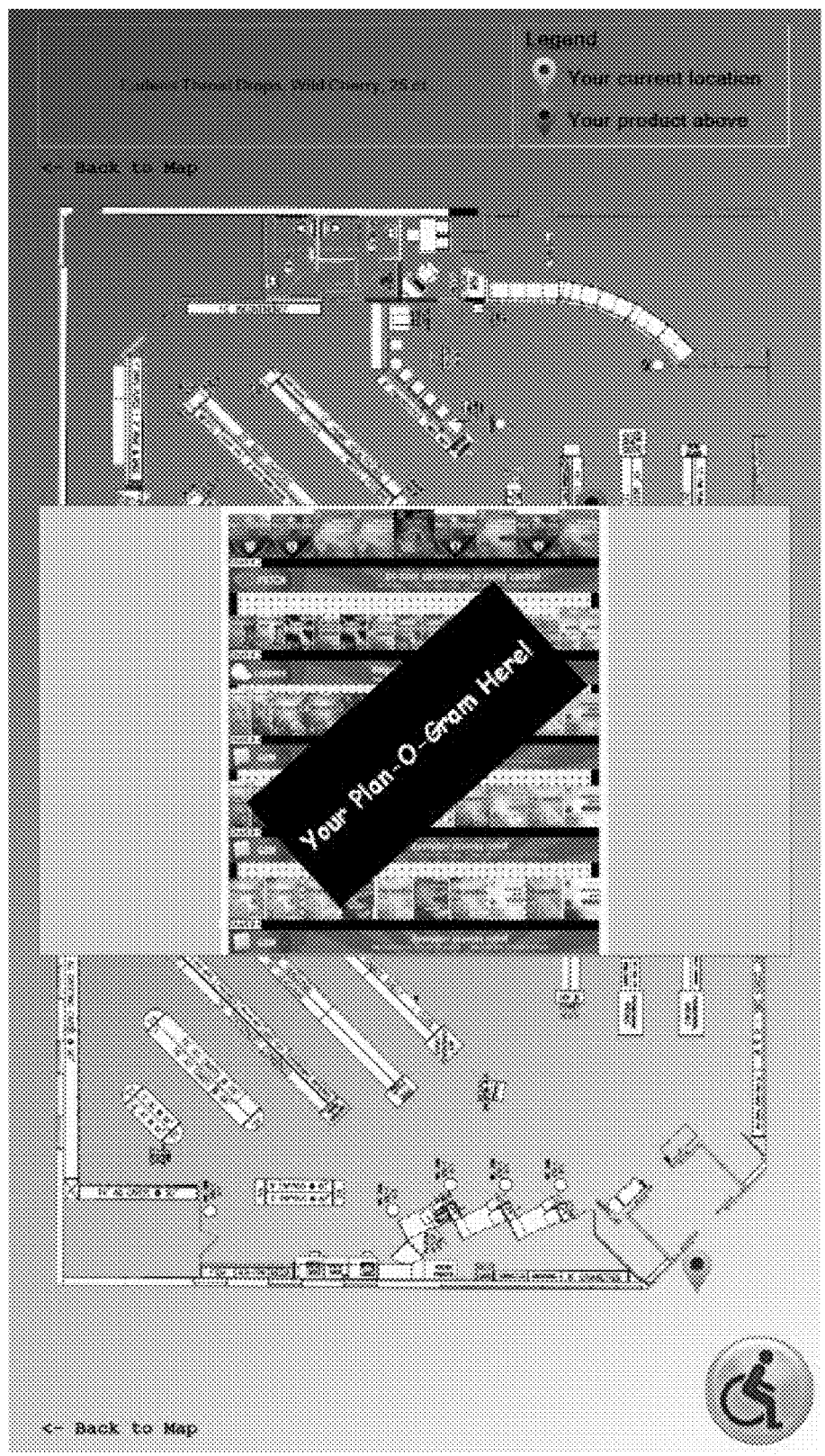
FIG. 8C provides an illustrative depiction of another GUI that may be used with a storage and retrieval system and method, wherein a portion of the GUI may include a map.

In an aspect, the software associated with a vending storage and retrieval system 110 may be configured such that selection of a "find a store" button may cause the screen to display a map, one illustrative depiction of a GUI for which is shown in FIG. 8A, and which map may identify street level store locations where the selected product may be found. In another aspect, the software also may be configured such that selection of an "aisle" button may cause the screen to display a store layout screen showing the aisle location of the product in a specific store, one illustrative depiction of a GUI for which is shown in FIG. 8B. Finally, the software may be configured such that selecting a locator tab from the store layout screen causes the screen to display a plan-o-gram for the selected product, one illustrative depiction of a GUI for which is shown in FIG. 8C.

Other screens, features, and/or functionality may be added to the item selection phase in a vending storage and retrieval system 110 and associated software without limitation unless so indicated in the following claims. It is contemplated that one or more vending storage and retrieval systems 110 may be in communication with one another such that information from one vending storage and retrieval system 110 (e.g., specific products available, number of products, etc.) may be accessed via another vending storage and retrieval system 110. This communication may be implemented via any suitable structure and/or method, including but not limited to wired networks, wireless networks, cellular networks, and/or combinations thereof without limitation unless so indicated in the following claims. Accordingly, it is contemplated that a vending storage and retrieval system 110 and associated software may be configured with LAN and/or WAN networking capabilities. Such capabilities may provide for relatively easy inventory tracking and subsequent restocking.

Figure 9A:
FIG. 9A provides an illustrative depiction of a GUI that may be used with a storage and retrieval system and method, wherein a portion of the GUI may include transactional functionality.
Figure 9B:
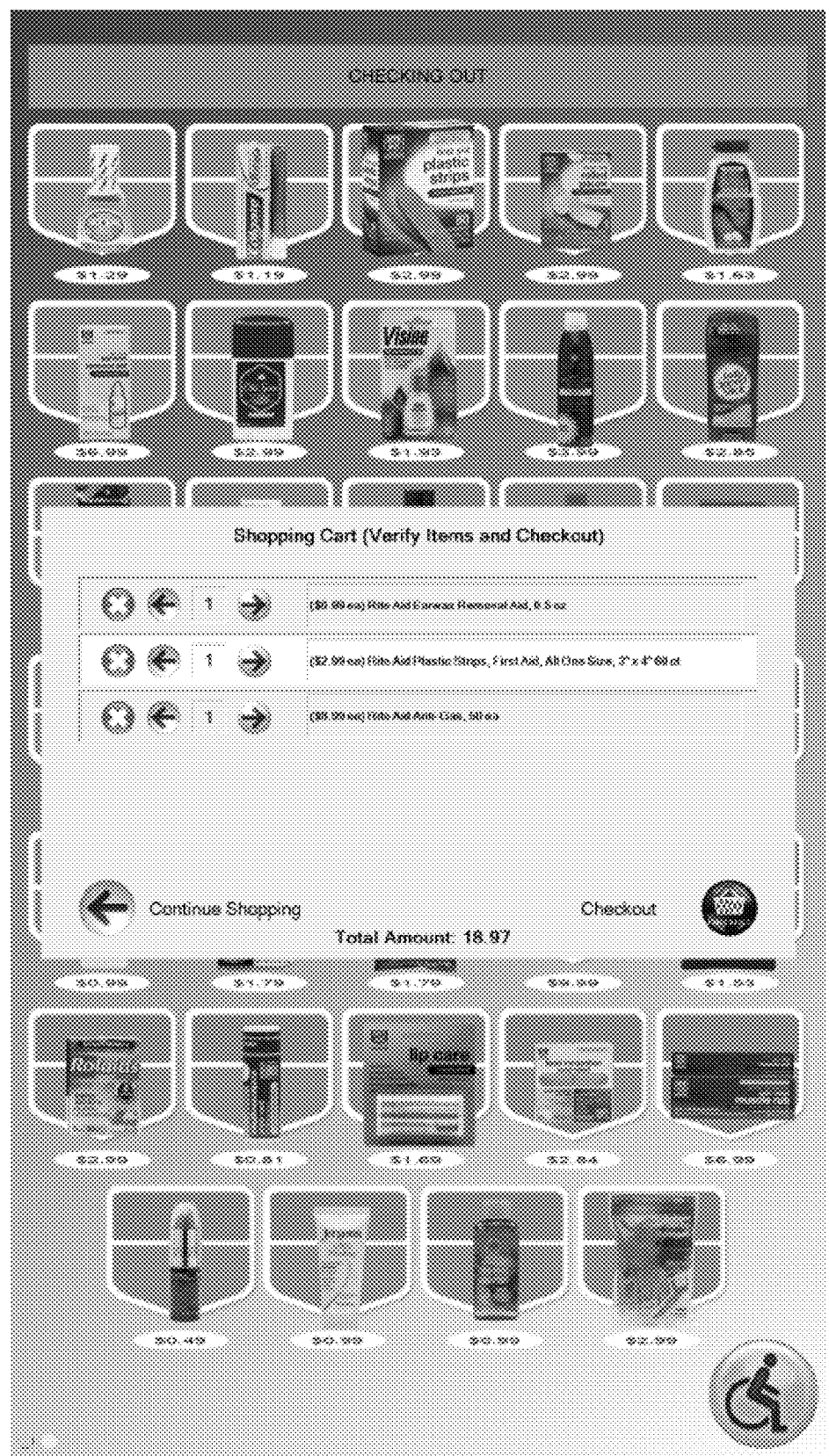
FIG. 9B provides an illustrative depiction of another GUI that may be used with a storage and retrieval system and method, wherein a portion of the GUI may include transactional functionality.
Figure 9C:
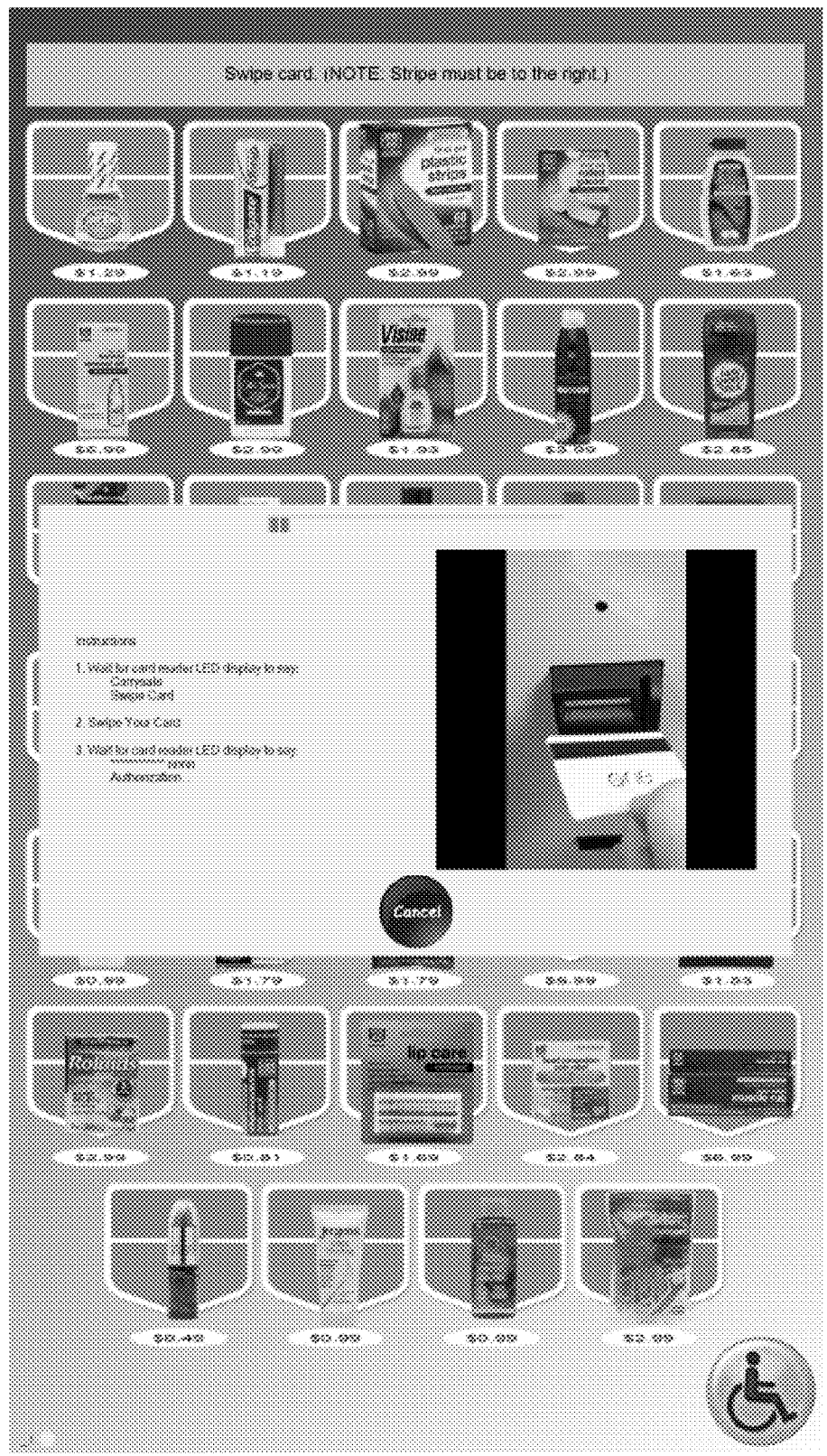
FIG. 9C provides an illustrative depiction of another GUI that may be used with a storage and retrieval system and method, wherein a portion of the GUI may include transactional functionality.

During a checkout phase of a transaction, the vending storage and retrieval system 110 and associated software may be configured such that the checkout process may generally be embodied as a three-step process comprising: (1) a user and/or purchaser selecting a "shopping cart" button on the screen (one illustrative depiction of a GUI for which is shown in FIG. 9A); (2) a user and/or purchaser reviewing the product(s) in the shopping cart and selecting a "checkout" button on the screen (one illustrative depiction of a GUI for which is shown in FIG. 9B); and, (3) a user and/or purchaser making payment (which may be performed via a card reader 117 engaged with the vending storage and retrieval system 110, wherein one illustrative depiction of a GUI for instructing a purchaser on how to make such a payment is shown in FIG. 9C). Generally, the illustrative depiction of a GUI in FIG. 9A may be for a main screen having items placed in the shopping cart.

Figure 9D:
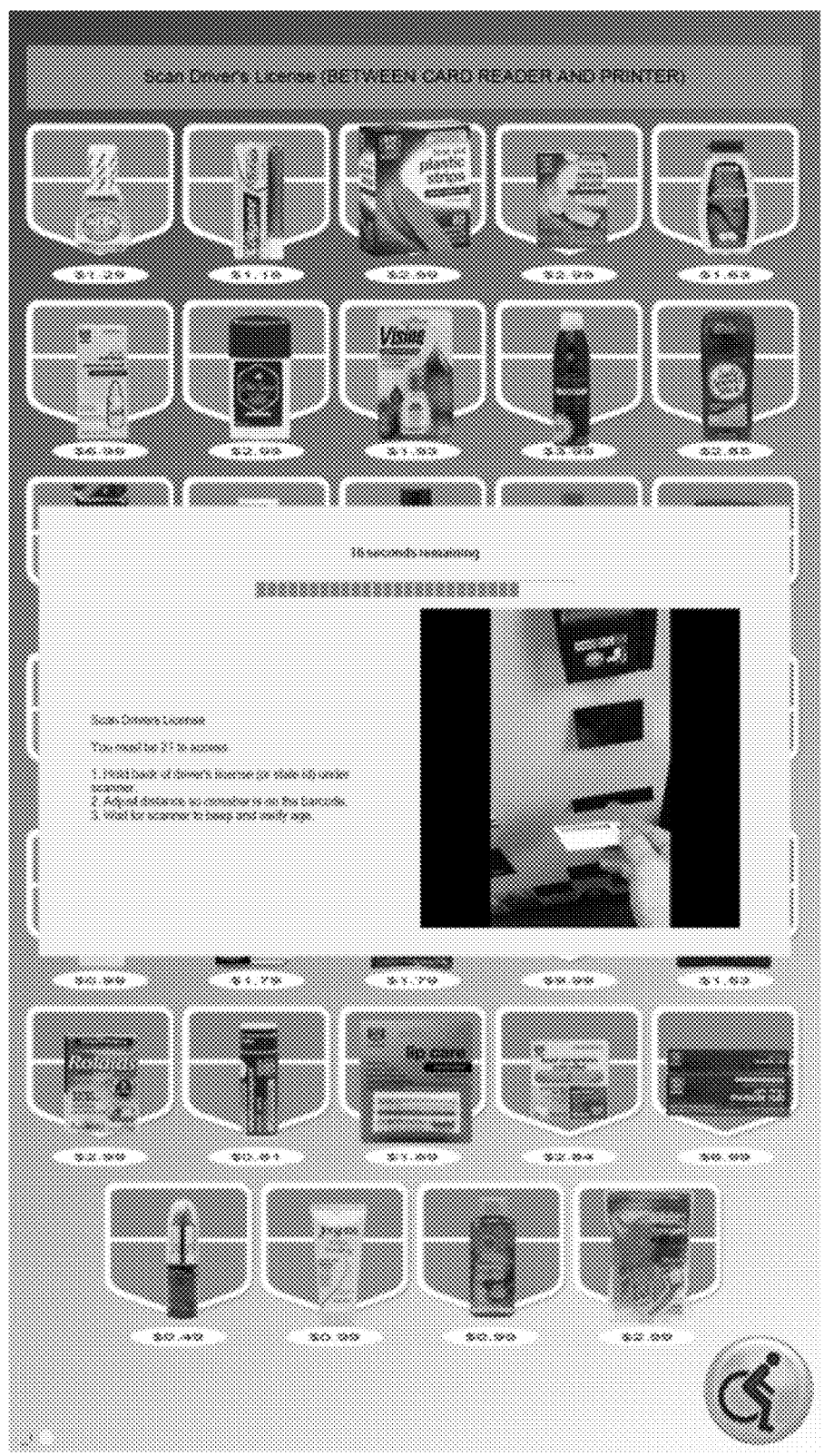
FIG. 9D provides an illustrative depiction of another GUI that may be used with a storage and retrieval system and method, wherein a portion of the GUI may include transactional functionality.
Figure 9E:
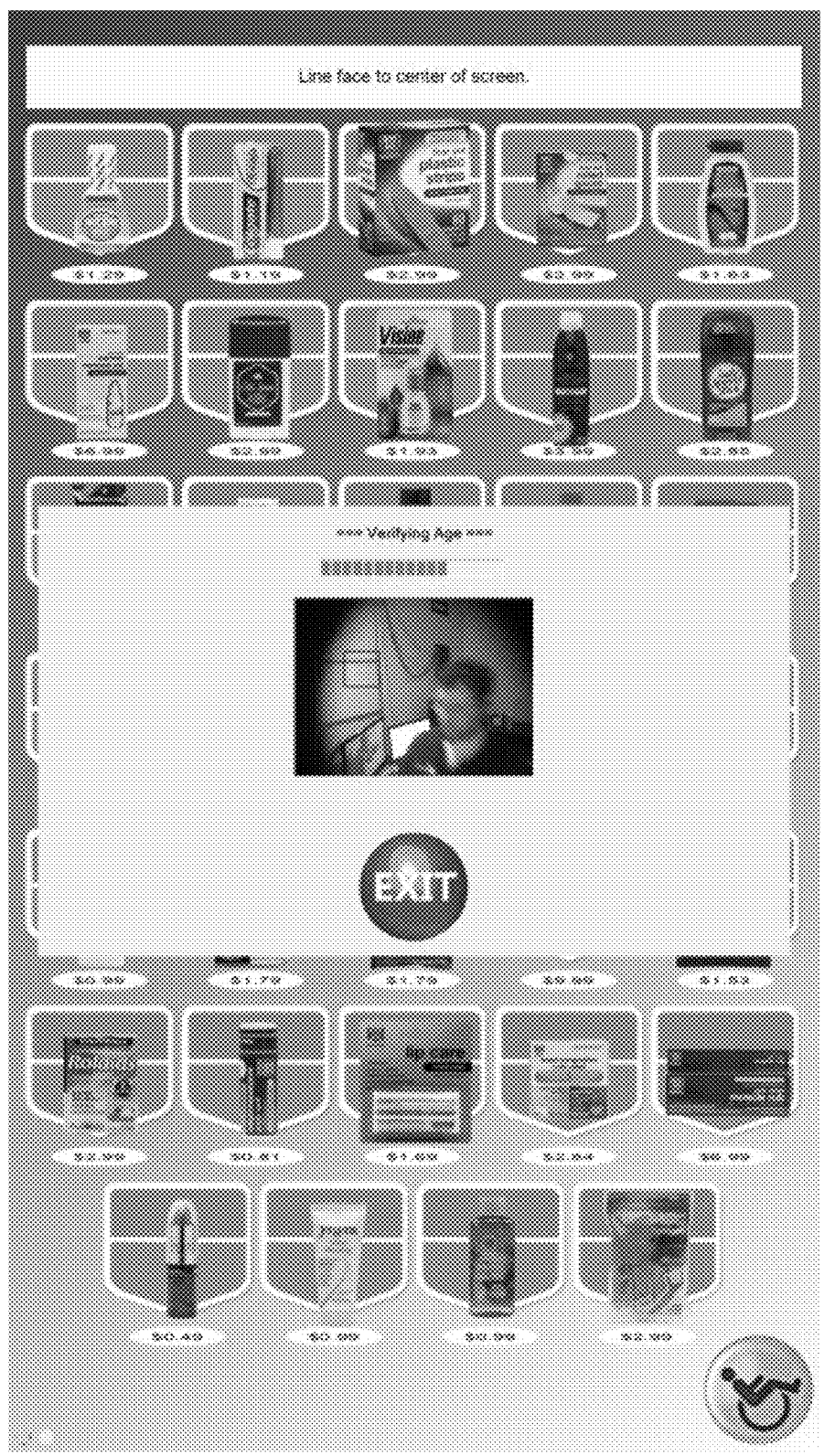
FIG. 9E provides an illustrative depiction of another GUI that may be used with a storage and retrieval system and method, wherein a portion of the GUI may include transactional functionality.
Figure 9F:
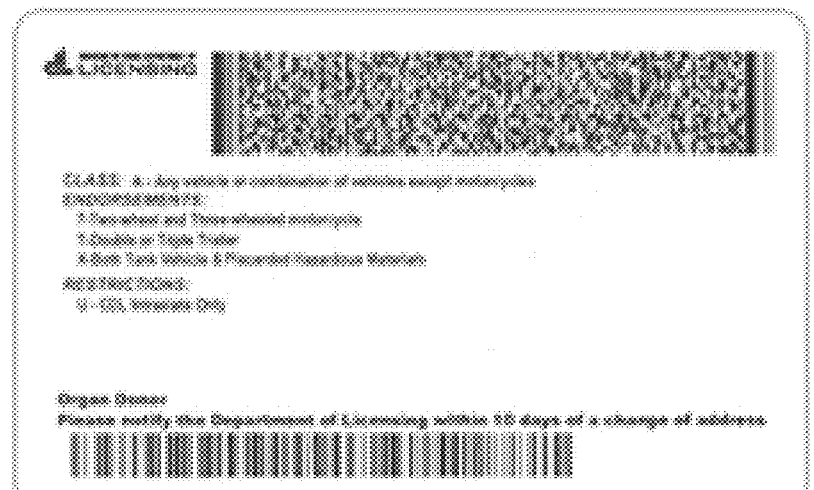
FIG. 9F provides an illustrative depiction of one type of identification card that may be used with certain aspects of a storage and retrieval system and method.

As previously discussed, the vending storage and retrieval system 110 and associated software may be configured such that one or more specific products within the vending storage and retrieval system 110 require age and/or additional verification prior to purchase/retrieval. In such an aspect, the software may be configured such that during the checkout process, the user and/or purchaser must scan a driver's license and/or other government-issued identification (or other adequate identity and/or age verification document) prior to purchase/retrieval of the specific age-restricted product using a scanner 118 that may be included in a vending storage and retrieval system 110. One illustrative depiction of a GUI for instructing a purchaser regarding how to scan such an identity and/or age verification document is shown in FIG. 9D, and an illustrative depiction of such a document is shown in FIG. 9F. The software associated with the vending storage and retrieval system 110 may be configured to require a purchaser to scan the identity and/or age verification document within a certain time period, and upon the expiration thereof return to a previous screen (e.g., main screen with shopping cart emptied, shopping cart screen with age-restricted item removed, etc.).

In an aspect, the vending storage and retrieval system 110 may include a camera 116, which camera 116 may be configured to scan the face of the user and/or purchaser to confirm and/or independently determine age, gender, and/or other features with the user's and/or purchaser's government-issued identification and/or other identity and/or age verification document). The software associated with the vending storage and retrieval system 110 may be configured such that written instructions and/or an instructional video may be displayed on the screen to assist a user and/or purchaser with this step. One illustrative depiction of a GUI that may be displayed during this step is shown in FIG. 9E. The software associated with a vending storage and retrieval system 110 may be configured such that when a user and/or purchaser uses a cashless payment option (e.g., credit card), the GUI requires the user and/or purchaser to provide a suitable identity and/or age verification document in such a position that a camera 116 may capture an image of the name printed thereon for comparison to the name associated with the cashless payment option. The associated software may then make such a comparison and halt the transaction if needed or allow the transaction to proceed.

In an aspect, the vending storage and retrieval system 110 shown in FIGS. 13, 14A, and 14B may comprise a receipt printer adjacent a receipt port 119, a top camera 116, a lower camera 116, a card reader 117, and/or a scanner 118. Additionally, the software associated with the vending storage and retrieval system 110 may be configured such that various GUIs may include a "handicapped" button as shown in FIGS. 7A, 7B, 8A-8C, 9A-9E, and 12, the selection of which may cause all buttons displayed on the screen 112 to be at or below 48 inches from the ground or floor, and which selection may activate the lower camera 116.

It is contemplated that a vending storage and retrieval system 110 and associated software may provide multiple benefits to a user and/or purchaser using the vending storage and retrieval system 110, which benefits include but are not limited to providing specific advertisements related to a product in which that user and/or purchaser may be interested, a detailed product description, and/or a location of a specific product if that product is not located in the specific vending storage and retrieval system 110 at which the user and/or purchaser is located. Additionally, it is contemplated that a vending storage and retrieval system 110 and associated software may be configured to securely and provide a point of sale for fragile and/or restricted items (certain medicine, electronics, media, etc.) and items of various package sizes while simultaneously providing a relatively secure storage for high-theft and/or high value items.

Figure 10:
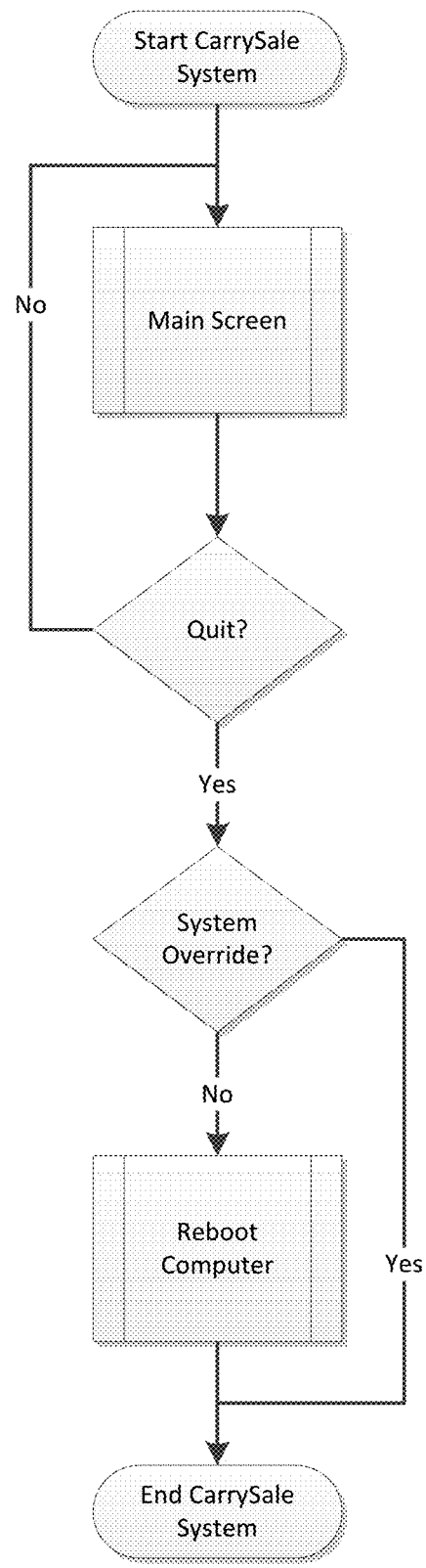
FIG. 10 provides a schematic view of a logic diagram of an operation that may be implemented in a storage and retrieval system and method.
Figure 11:
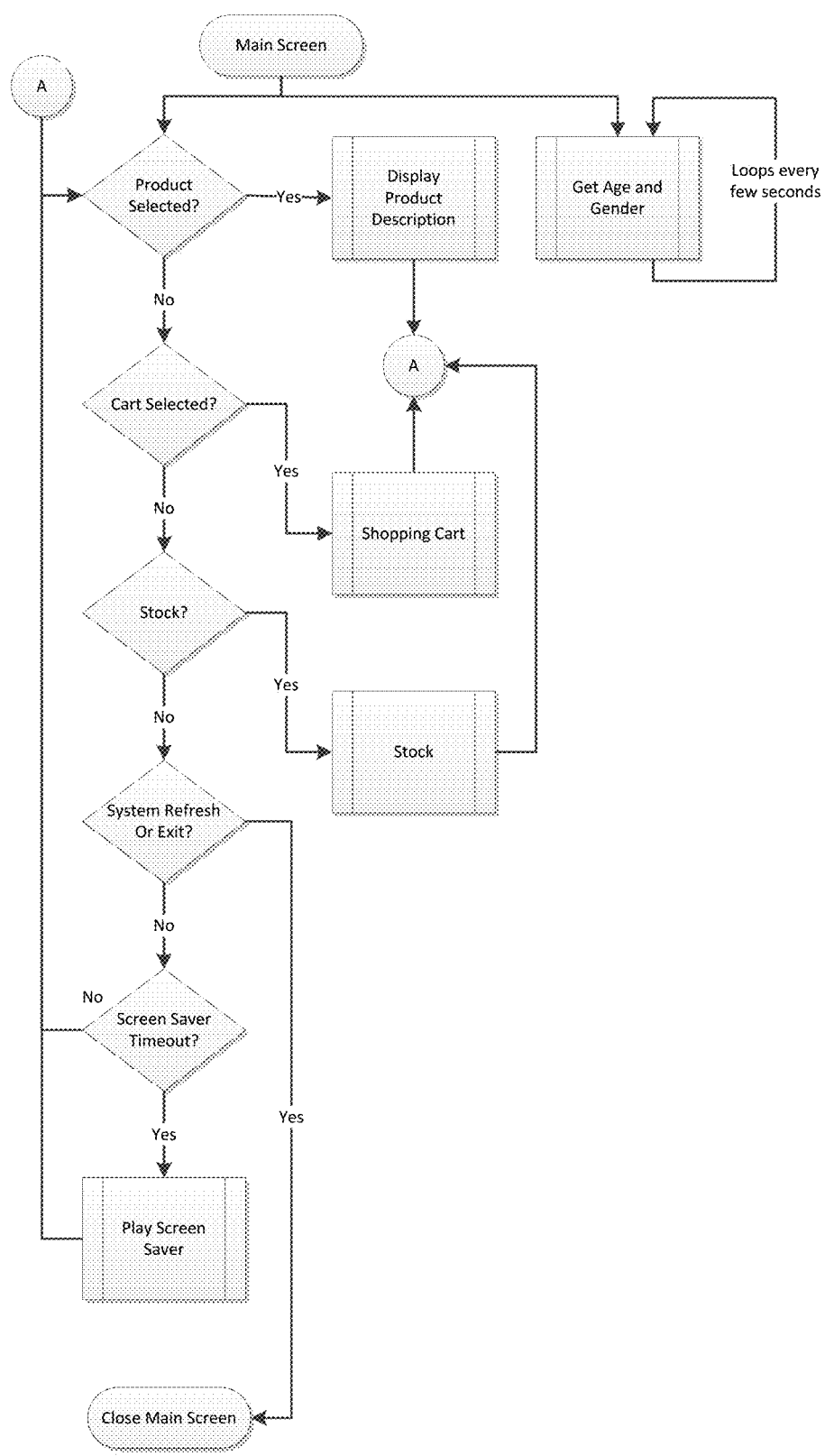
FIG. 11 provides a schematic view of a logic diagram of another operation that may be implemented in a storage and retrieval system and method.
Figure 12:
FIG. 12 provides an illustrative depiction of a GUI that may be used with a storage and retrieval system and method.

An illustrative program loop for software associated with a vending storage and retrieval system 110 is shown schematically in FIG. 10. Various design and/or software constraints are further described in Section 4.3, and various policy and/or tactic considerations are described in Section 5 of Appendix A attached hereto An illustrative program loop for software associated with a main screen GUI associated with a vending storage and retrieval system 110 is shown in FIG. 11. In an aspect, the main screen may be configured to display each product in that specific vending storage and retrieval system 110 (see FIGS. 7A and 12). Further, the software may be configured such that at least the following events cause a different display from the main screen GUI: (1) a user and/or purchaser selecting a product, which may result in display of a product description screen (see FIGS. 7B and 7C); (2) a user and/or purchaser selecting the shopping cart, which may result in display of a shopping cart screen (see FIG. 9B); (3) a stock procedure being initiated by a user and/or third party service organization, which may result in display of an inventory maintenance screen; (4) a system refresh timeout or other exit, which may close the main screen GUI while saving the current status and which may pass to the system software loop shown in FIG. 10 for proper treatment; (5) a screen saver timeout, which may result in a screen saver (which may be an advertisement) being displayed. The software may be configured such that another software loop may run concurrent with that depicted in FIG. 11. The other software loop may be configured to determine the age, gender, and/or other information of individuals passing by the vending storage and retrieval system 110 but not directly interacting therewith.

The preceding constraints, examples, and configurations in any of the embodiments and/or aspects disclosed and described herein are for illustrative purposes only, and are in no way limiting to the scope of any of the systems and/or methods as disclosed and claimed herein unless so indicated in the following claims. Furthermore, the various solutions, software, GUIs, processes, methods, modules, web-based applications, websites, and/or embodiments disclosed or described herein may be implemented in conjunction with one another or independently from one another. Accordingly, the presence or absence of other subject matter that may be complementary to the present systems and/or methods in no way limits the scope of the present systems and/or methods unless so indicated in the following claims.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The storage and retrieval system 10 and vending storage and retrieval system 110 and various elements thereof may be constructed of any suitable material known to those skilled in the art. In the embodiments as pictured herein, it is contemplated that most elements will be constructed of metal or metallic alloys, polymers, or combinations thereof. However, other suitable materials may be used without limitation unless so indicated in the following claims.

It should be noted that the storage and retrieval system 10, vending storage and retrieval system 110, and/or various elements thereof are not limited to the specific embodiments pictured and described herein, but is intended to apply to all similar apparatuses and methods for conveniently storing, recalling, retrieving, vending, and/or otherwise managing items. Modifications and alterations from the described embodiments will occur to those skilled in the art without departure from the spirit and scope of the storage and retrieval system 10 and/or vending storage and retrieval system 110.

Furthermore, variations and modifications of the foregoing are within the scope of the storage and retrieval system 10 and/or vending storage and retrieval system 110. It is understood that the storage and retrieval system 10 and vending storage and retrieval system 110 as disclosed and defined herein extend to all alternative combinations of two or more of the individual features and/or methods mentioned or evident from the text and/or drawings. All of these different combinations constitute various alternative aspects of the storage and retrieval system 10 and vending storage and retrieval system 110. The embodiments described herein explain the best modes known for practicing the storage and retrieval system 10 and vending storage and retrieval system 110 and will enable others skilled in the art to utilize the same. The claims are to be construed to include alternative embodiments to the extent permitted by the prior art.

The invention claimed is:

1. A storage and retrieval system comprising:
  a. a plurality of frame members engaged with one another to form a supporting frame structure;
  b. a storage assembly engaged with said supporting frame structure, said storage assembly comprising:
    i. a plurality of storage members, wherein each said storage member is configured to hold one or more items, and wherein each said storage member comprises a positioning assembly, said positioning assembly comprising: a plate engaged with a side surface of said storage member; a pin engaged with said plate, wherein said pin extends outward from said plate; a fixed arm engaged with said pin, wherein a roller is engaged with a distal end of said fixed arm, and wherein said fixed arm does not pivot with respect to said pin; and, at least one pivot arm engaged with said pin, wherein a connector is engaged with a distal end of said at least one pivot arm, wherein said pivot arm may pivot with respect to said pin, and wherein said connector is engaged with said coupling member such that said pivot arm does not pivot with respect to said coupling member about said connector;
    ii. a drive member mounted within said supporting frame structure, wherein said drive member is engaged with said plurality of storage members such that mechanical energy from said drive member may be communicated to said plurality of storage members;
    iii. a first side plate affixed to said supporting frame structure, wherein a guide is fashioned on an interior surface of said first side plate;
    iv. a second side plate opposing said first side plate, wherein said second side plate is affixed to said supporting frame structure, wherein a second guide is fashioned on an interior surface of said second side plate, and wherein the dimensions and orientations of said guide and said second guide are substantially mirror images of one another; and,
    v. a coupling member engaged with said plurality of storage members, wherein said coupling member communicates mechanical energy from said drive member to said plurality of storage members;
  c. a front exterior panel mounted to said frame structure, wherein said front exterior panel comprises:
    i. an access port, wherein said access port allows a user to interact with at least one said storage member from a position exterior to said supporting frame structure;
    ii. a door flap selectively moveable to block said access port via a door flap actuator;
    iii. a first display positioned above said access port;
    iv. an invisible light curtain positioned over said access port;
  d. a central processing unit in communication with said drive member, said door flap actuator, said invisible light curtain, and said first display, wherein said central processing unit is configured to prevent said door flap actuator from closing said door flap when an object is positioned in said light curtain.

2. The storage and retrieval system according to claim 1 wherein said first side plate further comprises a drive keeper, and wherein said coupling member is further defined as being positioned within said drive keeper.

3. The storage and retrieval system according to claim 2 wherein said coupling member is further defined as a link chain.

4. The storage and retrieval system according to claim 3 wherein said drive member is further defined as a sprocket configured to receive rotational energy from an electric motor.

5. The storage and retrieval system according to claim 2 wherein said coupling member is further defined as a belt.

6. The storage and retrieval system according to claim 5 wherein said drive member is further defined as a pulley configured to receive rotational energy from an electric motor.

7. The storage and retrieval system according to claim 1 further comprising a scanner positioned proximate said access port and in communication with said central processing unit for identity verification prior to allowing interaction with at least one said storage member from a position exterior to said supporting frame structure.

* * * * *